United States Patent [19]

Chattopadhya

[11] Patent Number: 4,722,051
[45] Date of Patent: Jan. 26, 1988

[54] COMBINED READ/WRITE CYCLE FOR A DIRECT MEMORY ACCESS CONTROLLER

[75] Inventor: Sandip Chattopadhya, Setauket, N.Y.
[73] Assignee: NCR Corporation, Dayton, Ohio
[21] Appl. No.: 759,373
[22] Filed: Jul. 26, 1985
[51] Int. Cl.[4] ............................................. G06F 13/28
[52] U.S. Cl. .................................................... 364/200
[58] Field of Search ... 364/200 MS File, 900 MS File

[56] References Cited

U.S. PATENT DOCUMENTS 4,479,179 10/1984 Dinwiddie ........................ 364/200
4,481,578 11/1984 Hughes ............................. 364/200

Primary Examiner—Archie E. Williams, Jr.
Assistant Examiner—A. Mohamed
Attorney, Agent, or Firm—Wilbert Hawk, Jr.; Edward Dugas; Floyd A. Gonzalez

[57] ABSTRACT

A data processing system has a plurality of peripheral devices and a main memory, a direct memory access controller for controlling the transfer of data between the main memory and the peripheral devices including a local memory connected to the peripheral devices for storing data written to and read from the peripheral devices, a sequencer for controlling the transfer of data between the main memory and the local memory, a local address register connected to the sequencer for providing the local memory address for memory operations of the local memory, a system address register connected to the sequencer for providing the main memory address for memory operations of the main memory, and a data register for holding data transferred between the main memory and the local memory. The sequencer includes a controller for generating control signals for the main memory, the local memory and the data register in control cycles to transfer a word of data between the main memory and the local memory in a single control cycle.

21 Claims, 24 Drawing Figures

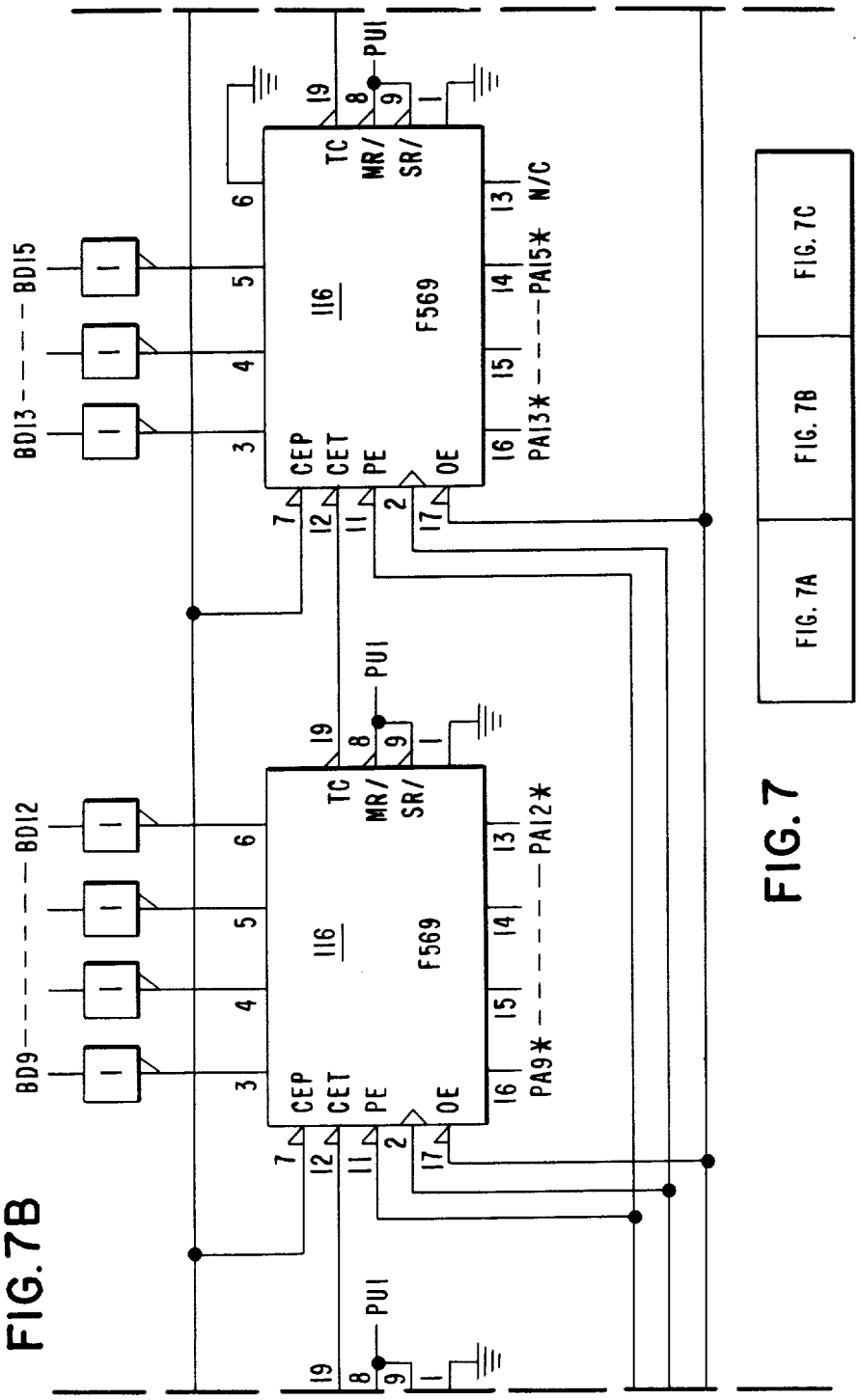

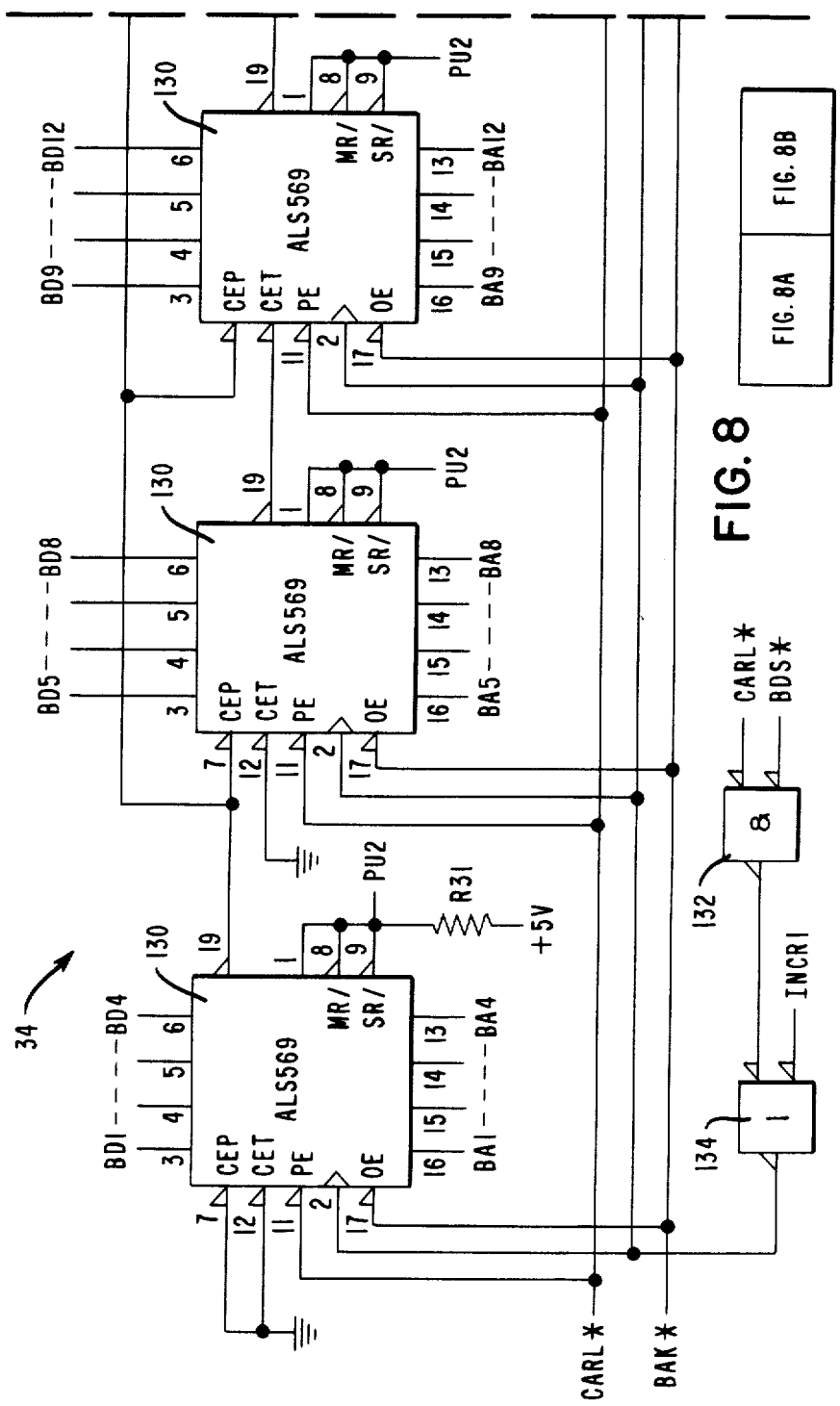

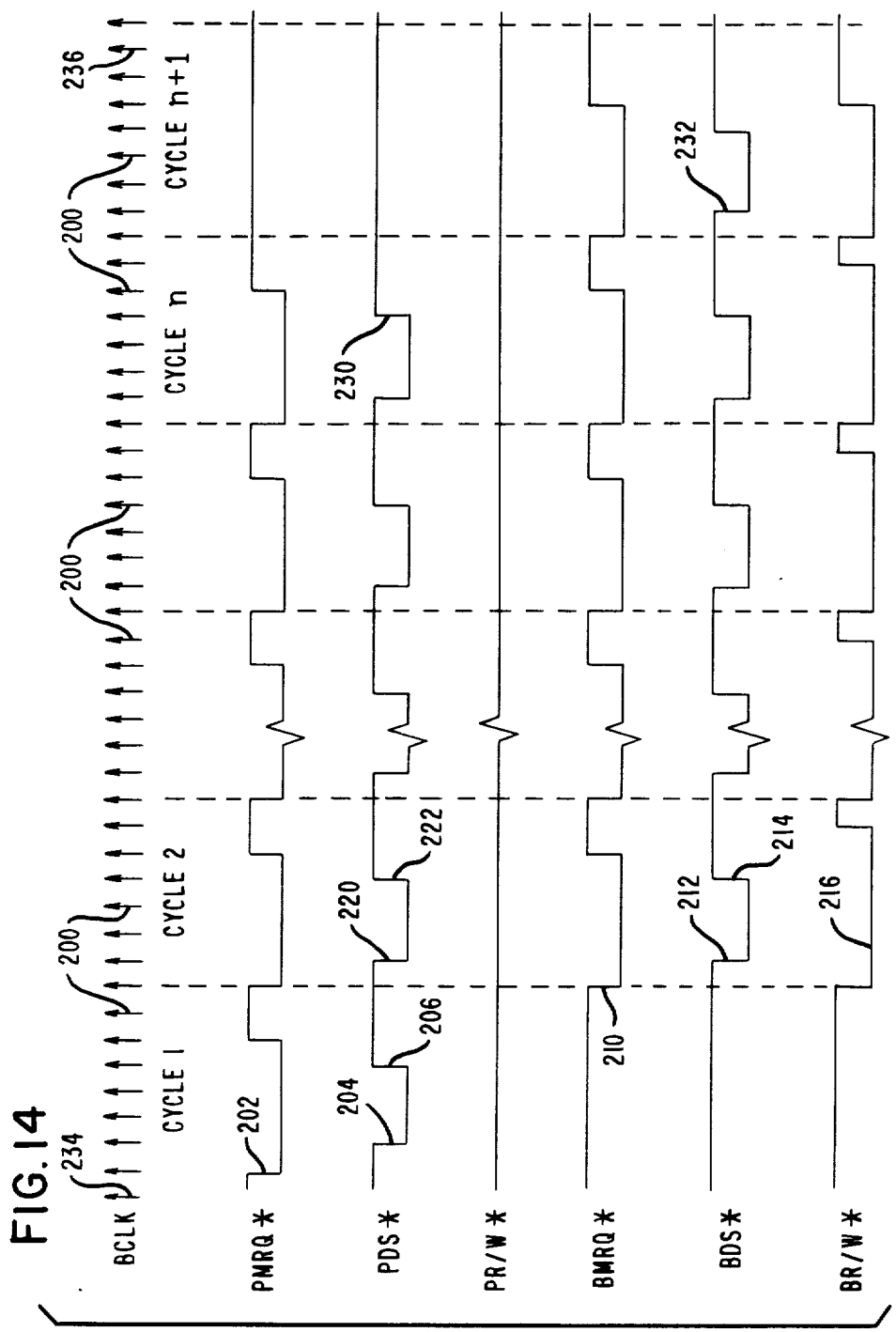

COMBINED READ/WRITE CYCLE FOR A DIRECT MEMORY ACCESS CONTROLLER

BACKGROUND OF THE INVENTION

The present invention relates to input/output controllers for use in digital data processing systems for transferring data between a memory and one or more peripheral devices, and more particularly relates to a direct memory access (DMA) controller which reads data into a register and writes data out of that register in the same cycle.

Direct memory access controllers which transfer data between peripheral devices and a main memory by accessing the memory directly are well known. Since the input/output speed of the peripheral devices is generally different than the input/output speed of the memory, controllers which allow for the transfer of data between the memory and a peripheral device without tying up the data processing system for long periods of time are used.

U.S. Pat. No. 4,371,932 issued Feb. 1, 1983 to Dinwiddie Jr. et al. for "I/O Controller For Transferring Data Between A Host Processor And Multiple I/O Units" discloses an I/O controller which includes an interleaving mechanism for enabling concurrent performance of two different modes of data transfer between a host processor and the I/O controller.

U.S. Pat. No. 4,075,691 issued Feb. 21, 1978 to Davis et al. for "Communication Control Unit" discloses a communication control unit for operably coupling a plurality of peripheral devices to a data processing system including a direct memory access module for communicating with a memory of the data processing system.

Other patents which show the state of the art include: U.S. Pat. No. 3,818,461 issued June 18, 1974 to Ward et al. for "Buffer Memory System"; U.S. Pat. No. 4,040,027 issued Aug. 2, 1977 to van Es et al. for "Digital Data Transfer System Having Delayed Information Readout From A First Memory Into A Second Memory"; U.S. Pat. No. 263,648 issued Apr. 21, 1981 to Stafford et al. for "Split System Bus For Direct Memory Access of Peripherals In A Cathode Ray Tube Display System"; and U.S. Pat. No. 4,371,929 issued Feb. 1, 1983 to Brann et al. for "Multiprocessor System With High Density Memory Set Architecture Including Partitionable Cache Store Interface To Shared Disk Drive Memory."

SUMMARY OF THE INVENTION

In a specific embodiment, a data processing system is disclosed having a plurality of peripheral devices, a main memory and a direct memory access controller for controlling the transfer of data between the main memory and the peripheral devices. The direct memory access controller has a local memory connected to the peripheral devices for storing data written to and read from the peripheral devices, a sequencer for controlling the transfer of data between the main memory and the local memory, a local address register connected to the sequencer for providing the local memory address for memory operations of the local memory, a system address register connected to the sequencer for providing the main memory address for memory operations of the main memory, and a data register for holding data transferred between the main memory and the local memory. The sequencer includes a controller for generating control signals for the main memory, the local memory and the data register in control cycles to transfer a word of data between the main memory and the local memory in a single control cycle.

It is thus an object of the present invention to provide a direct memory access controller which reads data from one memory and writes that data to a second memory in the same cycle.

It is also an object of the present invention to provide a direct memory access controller which controls the transfer of data between a main memory at an address in a system address register, and a local memory at an address in a local address register.

It is also an object of the present invention to provide a direct memory access controller which transfers n words of data between a main memory and a local memory in n+1 cycles.

These and other objects of the present invention will become apparent from the drawings and preferred embodiment disclosed herein.

BRIEF DESCRIPTION OF THE DRAWINGS

FIG. 7 is a map showing the relationship of FIGS. 7A-7C, which, when taken together, present a block diagram of a system address register of the DMA decoder of FIG. 1;

FIG. 7B is another portion of the block diagram of the system address register;

FIG. 8 is a map showing the relationship of FIGS. 8A-8B, which, when taken together, present a block diagram of a local address register of the DMA converter of FIG. 1;

FIG. 8A is a portion of the block diagram of the local address register;

FIG. 14 is a timing diagram showing the relationship of memory control signals during a data transfer operation of the DMA controller of FIG. 1.

DESCRIPTION OF THE PREFERRED EMBODIMENT

Figure 1:
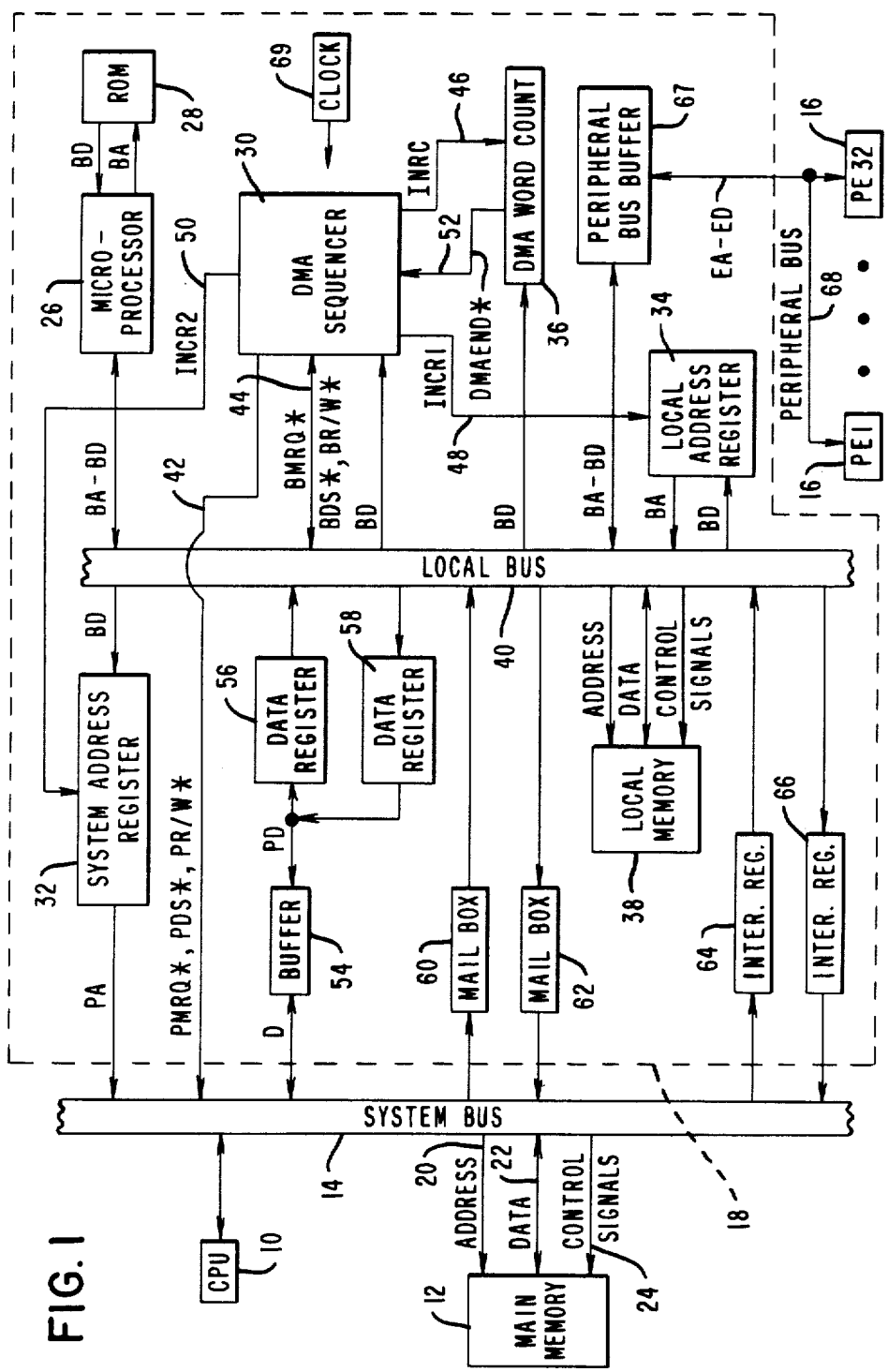
FIG. 1 is a block diagram of a data processing system including a DMA controller of the present invention.

FIG. 1 is a block diagram of a system which usable with the present invention, and includes a central processing unit (CPU) 10, a main memory 12, a system bus 14, a plurality of peripheral devices 16 designated PE1 through PE32, and a controller board 18 for controlling the exchange of data between the peripheral devices 16 and the main system bus 14 as will be discussed. An address line 20 is provided between the system bus 14 and the main memory 12 for passing addresses to the main memory 12 at which a memory operation is to take place. A bidirectional data bus 22 is provided to exchange data between the main memory 12 and the system bus 14. A control signal bus 24 is likewise provided between the system bus 14 and the main memory 12 for providing control signals to the main memory 12 for the memory operation which is to take place. As will be discussed, memory operations in the main memory 12 may be ordered by appropriate control signals over control signal bus 24 which issue either from the CPU 10 or the controller board 18.

The controller board 18 includes a microprocessor 26, and a read only memory (ROM) 28 which contains programming for the operation of the microprocessor 26. The controller board 18 also includes a direct memory access (DMA) sequencer 30, a system address register 32, a local address register 34, a DMA word count register 36, and a local memory 38. Communication between the microprocessor 26 and the elements of the controller board 18 is provided by a local bus 40.

As will be explained, the microprocessor 26 loads a beginning system address in the system address register 32, a beginning local address in the local address register 34, and a word count of the words to be transferred between the local memory 38 and the main memory 12 in the DMA word count register 36. The microprocessor 26 then instructs the DMA sequencer 30 to begin operation and indicates in which direction the data is to be transferred. The DMA sequencer 30 then issues control instructions over bus 42 to the system bus 14 for instructing the memory operations of the main memory 12, and instructions over bus 44 to the local bus 40 for controlling the local memory 38. If, for instance, the data transfer is to be for a specified number of words from the local memory 38 to the main memory 12, the instructions over bus 42 would include a primary memory request signal (PMRQ*), and a primary memory read/write signal (PR/W*) for indicating that a write operation is to take place. A primary data strobe signal (PDS*) would be issued at the proper time to strobe the main memory 12 to complete the operation. Also, a board memory request signal (BMRQ*), a board memory read/write signal (BR/W*) for indicating that a read is to take place from the local memory, and a board memory data strobe signal (BDS*), would all be sent over bus 44 to the local bus 40, in the proper sequence, to read the desired data from the local memory 38. As will be explained, a word of data is read from the local memory 38 at the address supplied by the local address register 34, and passed to the main memory 12 to be written at the address contained in the system address register 32. The DMA sequencer 30 then issues a signal (INRC) over conductor 46, to the DMA word count register 38 to decrement the word count therein, a signal (INCR1) over conductor 48 to the local address register 34 to increase the local address contained therein, and a signal (INCR2) over conductor 50 to the system address register 32 to increase the address contained therein. If the word count in the DMA word count register 36 has been reduced to zero, a DMA-END* signal is sent over conductor 52 from the word count register 36 to the DMA sequencer 30 to indicate that the data transfer is complete. Otherwise, another word is transferred from the local memory 38 at the address now contained in local address register 34 to the main memory 12 at the address now located in system address register 32.

A buffer 54 is provided for buffering data coming into or going out of the controller board 18 for transfer over the system bus 14. An incoming data register 56 for data coming into the controller board 18 from the system bus 14 is provided, and an outgoing data register 58 is provided for data going out of the controller board 18 to the system bus 14. An incoming mailbox 60 is provided for messages coming from the CPU 10 to the microprocessor 26, and an outgoing mailbox 62 is provided for messages coming from the microprocessor 26 to the CPU 10. Also, an incoming interrupt register 64 is provided for supplying various interrupt signals to elements of the controller board 18, and an outgoing interrupt register 66 is provided for sending various interrupt messages from the controller board 18 to the CPU 10. A peripheral bus buffer 67 is included in the controller board 18 and is connected between a peripheral bus 68 connected to all of the peripheral devices, PE1--PE32 in the present embodiment, and the local bus 40. A controller board clock 69 is included for controlling the operation of the various elements of the controller board 18.

Figure 2A:
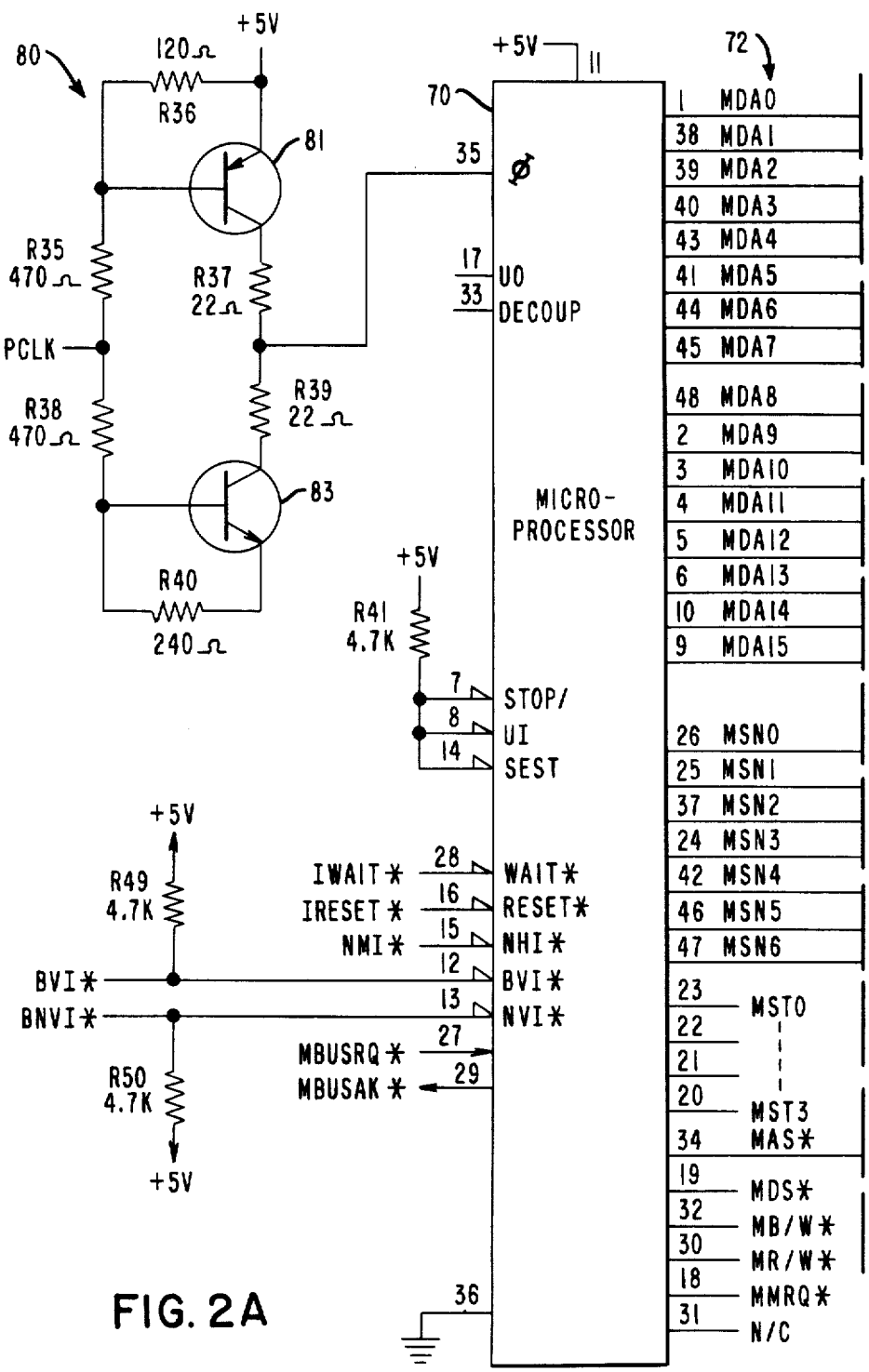
FIG. 2A is a portion of the block diagram of the processing element.
Figure 2B:
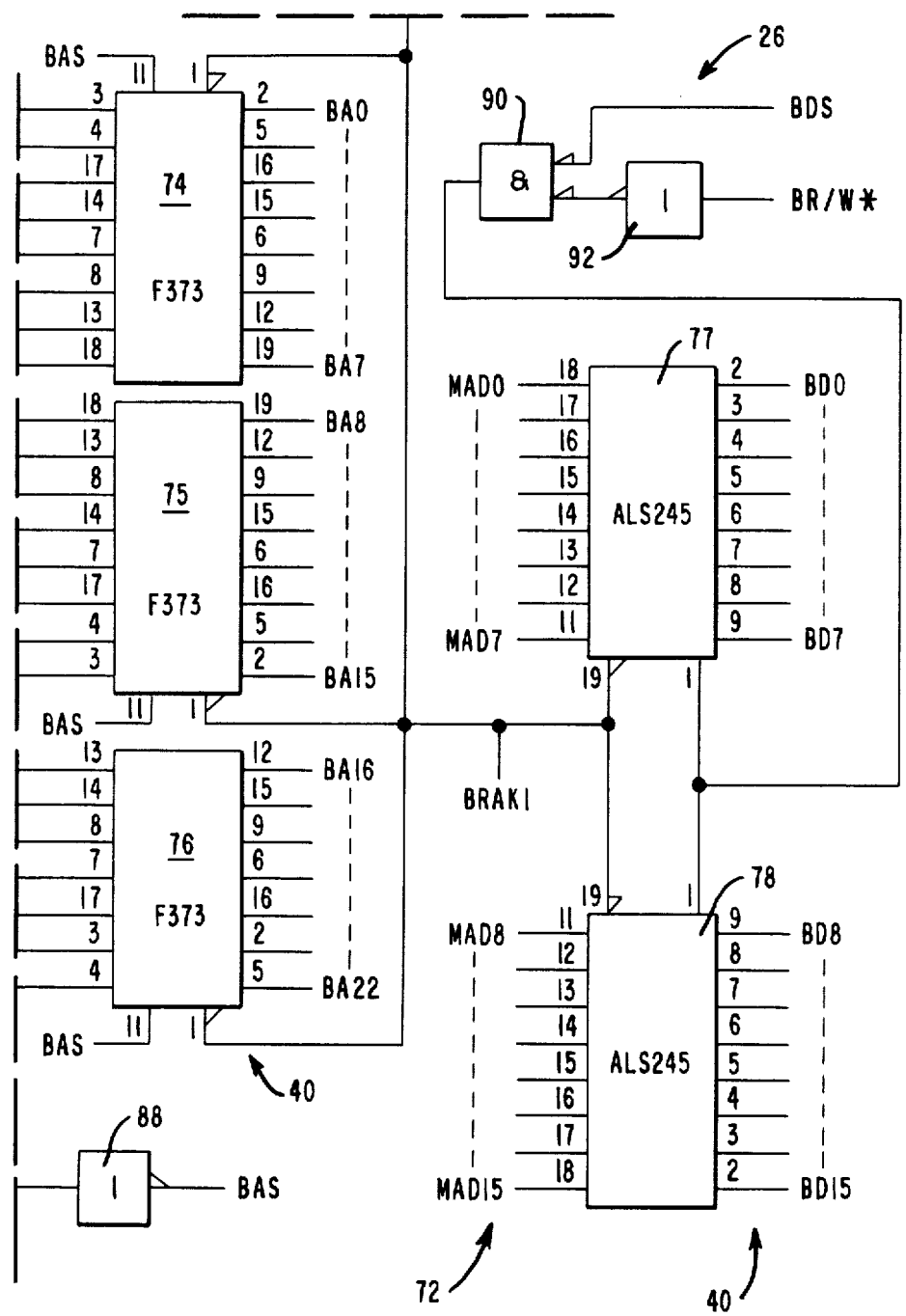
FIG. 2B is another portion of the block diagram of the processing element.
Figure 2:
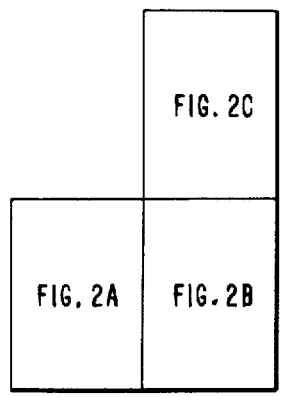
FIG. 2 is a map showing the relationship of FIGS. 2A-2C, which, when taken together, presents a block diagram of a processing element of the system of FIG. 1.
Figure 2C:
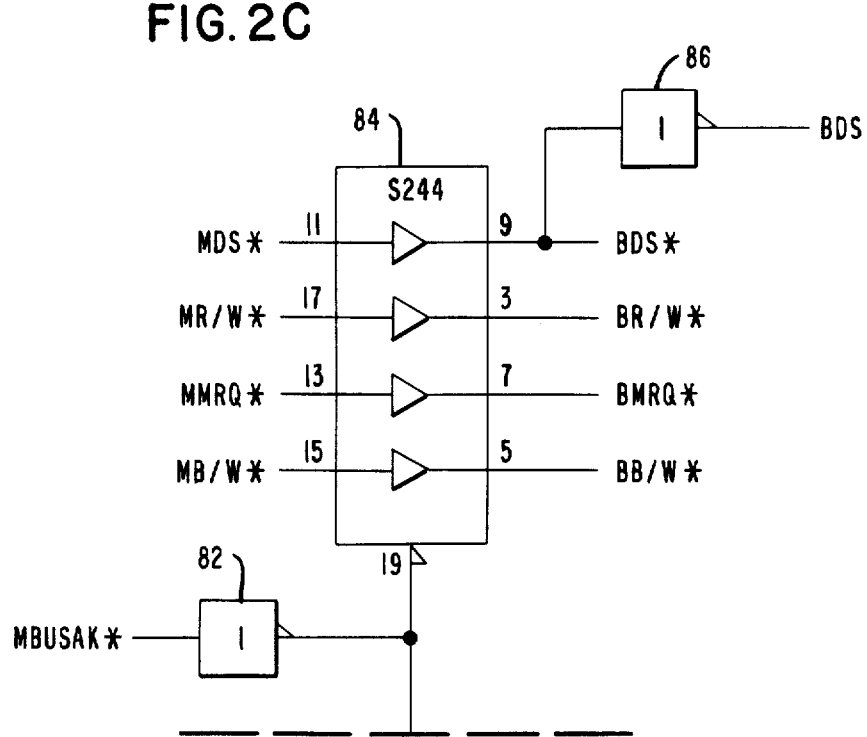
FIG. 2C is another portion of the block diagram of the processing element.

FIG. 2A-2C, when joined as shown in the map of FIG. 2, is a block diagram of the microprocessor 26 of FIG. 1, and includes a microprocessor chip 70, a microprocessor bus 72, and a plurality of tri-state devices 74-78 connected between the microprocessor bus 72 and the local bus 40 of FIG. 1. Tri-state devices 74, 75 and 76, which are 74F373 devices available from Fairchild, control address bits BA0-BA22 transmitted between the microprocessor bus 72 and the address portion of the local bus 40. Tri-state devices 77 and 78, which are 74ALS245 devices available from Texas Instruments, control the transmission of board address bits BD0-BD15 between the microprocessor bus 72 and the data portion of the local bus 40.

A microprocessor clock signal (PCLK) is inputted into a push-pull amplifier 80 formed of transistors 81 and 83, whose output is connected to the clock input, pin 35, of the microprocessor chip 70. The microprocessor chip of the disclosed embodiment is a Z8001B available from Zilog. The frequency of the clock pulses of clock signal PCLK is 8 megahertz.

As will be explained, requests for the microprocessor bus are inputted to pin 27 of the microprocessor chip 70 by a MBUSRQ* signal. When the microprocessor chip 70 completes its current task after the receipt of a MBUSRQ* signal on its pin 27, the microprocessor chip 70 outputs a microprocessor bus acknowledge (MBUSAK*) signal on its output pin 29. The MBUSAK* signal is inverted by inverter 82, whose output is inputted into the tri-state devices 74-78 such that the microprocessor chip 70 provides data bits on local bus 40 when the MBUSAK* signal is high. The inverted MBUSAK* signal is also inputted into the control terminal, pin 19 of a buffer 84. Buffer 84 is an 74S244 device available from Texas Instrument. Thus it will be understood, that when the MBUSAK* signal is high, it will be inverted by inverter 82 and inputted at pin 19 to buffer 84 to transmit the microprocessor data strobe signal (MDS*) as the board data strobe signal (BDS*). Also when the MBUSAK* signal is high, the microprocessor read/write (MR/W*) signal will be transmitted as BR/W*, the microprocessor memory request (MMRQ*) will be transmitted as the BMRQ* signal, and the microprocessor bus write (MB/W*) signal will be transmitted as the board bus write (BB/W*) signal. The BDS* signal is inverted by inverter 86 to give the BDS signal. The BR/W* signal is a buffered Read/Write control signal wherein read is "1" and write is "0". The BB/W* signal is a buffered byte/word signal wherein byte is "1" and word is "0".

The microprocessor address strobe (MAS*) signal is inverted by an inverter 88 to give the board address strobe signal (BAS). The BAS signal is inputted to tri-state devices 74-76 to control address signals outputted by the microprocessor chip on microprocessor bus 72 to the address portion of the local bus 40. The BDS signal is inputted to one input of a NAND gate 90, and the BR/W*signal is inverted by inverter 92 and inputted into the other input of NAND gate 90. The output of NAND gate 90 is connected to the tri-state devices 77 and 78 for controlling the output from the microprocessor bus 72 to the data portion of the local bus 40.

Even though the ROM 28 of FIG. 1 is shown connected directly to the microprocessor 26, it will be understood that the ROM 28 is in fact connected to the local bus 40. Addresses to the ROM 28 are controlled, as previously explained, by the tri-state devices 74-76 of FIG. 2B to address the ROM 28, and the instruction at that address is passed from the ROM 28 back to the microprocessor 26 through the tri-state devices 77 and 78. In a manner well understood by those skilled in the art, instructions are thus passed from the ROM 28 to the microprocessor 26 for execution in accordance with a program stored in the ROM 28. The other inputs and the outputs of the microprocessor chip 70, as labeled in FIG. 2A, are well understood in the art and will not be further explained herein.

Figure 3:
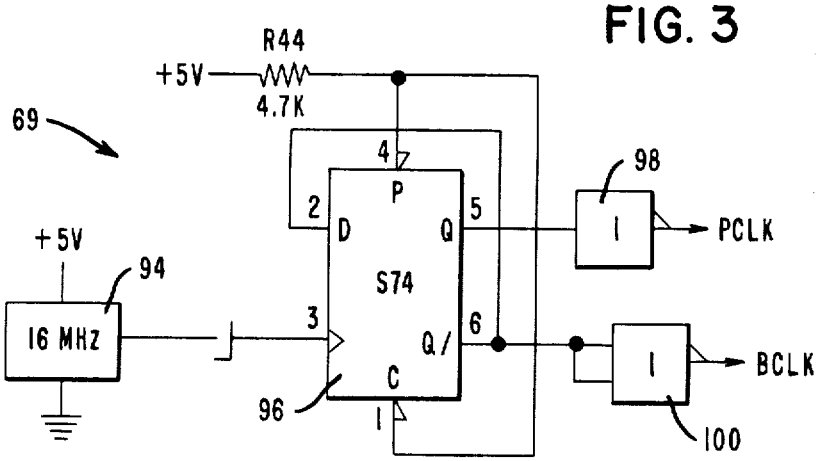
FIG. 3 is a block diagram of a clock circuit of the DMA controller of FIG. 1.

FIG. 3 is a block diagram of the clock circuit 69 of FIG. 1. A 16 megahertz oscillator 94 is connected to the dynamic clock input of a D type flip-flop 96 which acts as a divide-by-two circuit, giving a 8 megahertz output. Flip-flop 96 is an 74S74 device available from Texas Instruments. The one output Q of the flip-flop 96 is connected to an inverter 98 for supplying the processor clock (PCLK) signal, while the zero output Q/ of flip-flop 96 is connected to an inverter 100 for supplying the board clock (BCLK) signal. It will be understood that the BCLK signal from inverter 100 will be the complement of the PCLK signal from inverter 98.

Figure 4:
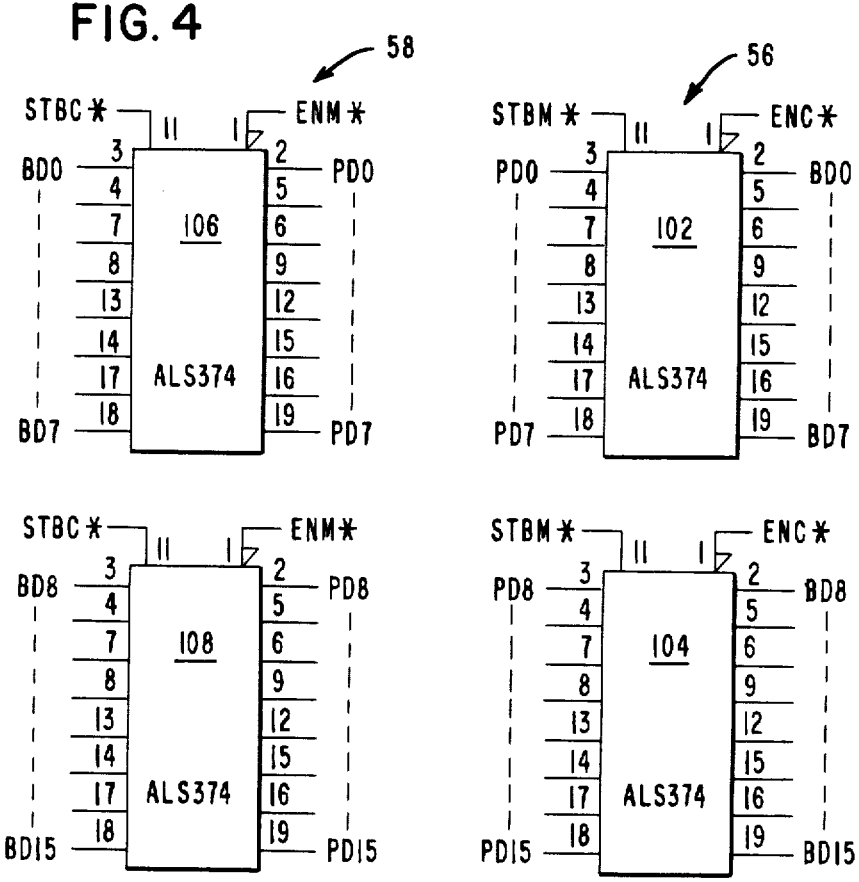
FIG. 4 is a block diagram of an incoming mail box and an outgoing mail box of the DMA controller of FIG. 1.

FIG. 4 is a block diagram of the data registers 56 and 58 of FIG. 1. Incoming data register 56 includes two tri-state devices 102 and 104 which pass primary data bits (PD0-PD15) from the system bus 14 of FIG. 1 to the board data bits (BD0-BD15) of the local bus 40 on the controller board 18. The primary data bits PD0-PD15 are loaded into the tri-state devices 102 and 104 by the signal STBM*, and the board data bits BD0-BD15 are placed on the local bus 40 by the signal ENC*. Outgoing data register 58 includes tri-state devices 106 and 108 which receive board data bits BD0-BD15 from the local bus 40, and places them as primary data bits PD0-PD15 on system bus 14. The board data bits BD0-BD15 are placed in the tri-state devices 106 and 108 by the signal STBC*, and the data bits are placed from the tri-state devices 106 and 108 on the system bus 14 by the signal ENM* the signals ENC* thus constitute first control signals for controlling the output of the registers 56 and 58, respectively and the signals STBM* and STBC* constitute second control signals for controlling the inputting data signals to registers 56 and 58, respectively. Tri-state devices 102, 104, 106 and 108 are 74ALS374 devices available from Texas Instruments.

Figure 5:
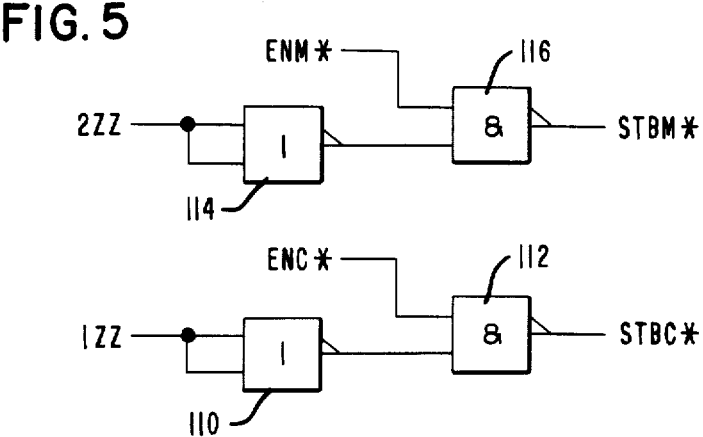
FIG. 5 is a block diagram of a control circuit for the mail boxes of FIG. 4.

FIG. 5 is a schematic diagram of a timing circuit for the data registers 56 and 58 of FIG. 4. A timing signal 1ZZ is inputted into an inverter 110, whose output in outputted into one input of a NAND gate 112. The enable signal ENC* is inputted into the other input of NAND gate 112, whose output is the STBC* signal discussed in connection with tri-state devices 106 and 108 of FIG. 4. The timing signal 1ZZ and the enable signal ENC* come from the DMA sequencer 30 of FIG. 1, as will be discussed. A timing signal 2ZZ is inputted into an inverter 114, whose output is connected to one input of a NAND gate 116. The other input of NAND gate 116 receives the enable signal ENM*, and its output provides the STBM* signal discussed in connection with tri-state devices 102 and 104 of FIG. 4. The timing signal 2ZZ and the enable signal ENM* also come from the DMA sequencer 30. Messages between the microprocessor 26 and the CPU 10 are transmitted through the mailbox 60 and 62. The mailboxes 60 and 62 are used in a well-known manner to transmit messages, such as the starting system address and the number of words to be transmitted by the microprocessor from the local memory 38 to the main memory 12, or for identifying one of the peripheral devices 16 which is to transmit data to or from the main memory 12. The microprocessor 26 regularly interrogates its mailbox 60 to see if any messages for it have been received. After an exchange of messages through the mailboxes 60 and 62, the microprocessor 26 is ready to initiate the transfer of data between the local memory 38 and the main memory 12.

Figure 6:
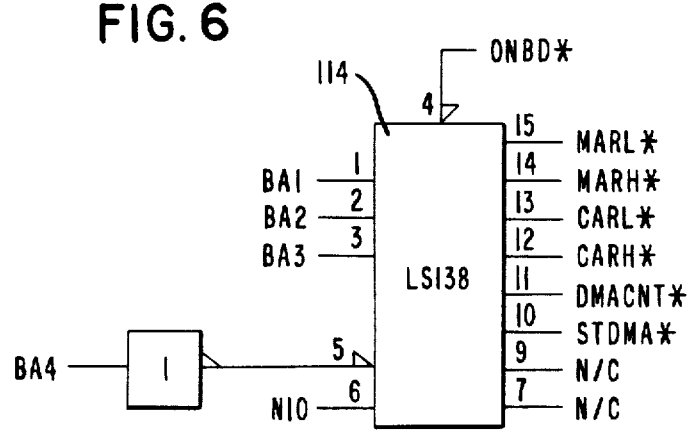
FIG. 6 is a block diagram of an input/output decoder of the DMA decoder of FIG. 1.

FIG. 6 is a block diagram of an input/output (I/O) decoding circuit for decoding instructions from the microprocessor chip 70 of FIG. 2 which address various elements of the processor board 18. The address bits BA0-BA22 of the address portion of the local bus 40 (see FIG. 2) are decoded by an appropriate decoder (not shown) to determine if the microprocessor chip 70 has issued an I/O instruction. When an I/O instruction is detected, the ONBD* signal of FIG. 6 is activated to enable a one-of-eight decoder 114, which is an 74LS138 device available from Texas Instruments. The one-of-eight decoder 114 decodes the address bits BA1-BA3 to address one of the elements of the controller board 18.

If the address is "0", the lower portion of the system address register 32 of FIG. 1 is selected by the MARL* signal. If the address is "2(H)" the higher portion of the system address register 32 is selected by the MARH* signal. An address of "4(H)" selects the lower portion of the local address register 34 of FIG. 1 by the CARL* signal. An address of "6(H)" selects the higher portion of the local address register 34 by the CARH* signal. An address of "8(H)" selects the DMA word count register 36 of FIG. 1 with the DMACNT* signal. An address of "A(H)" addresses the DMA sequencer 30 by the STDMA* signal.

Figure 7A:
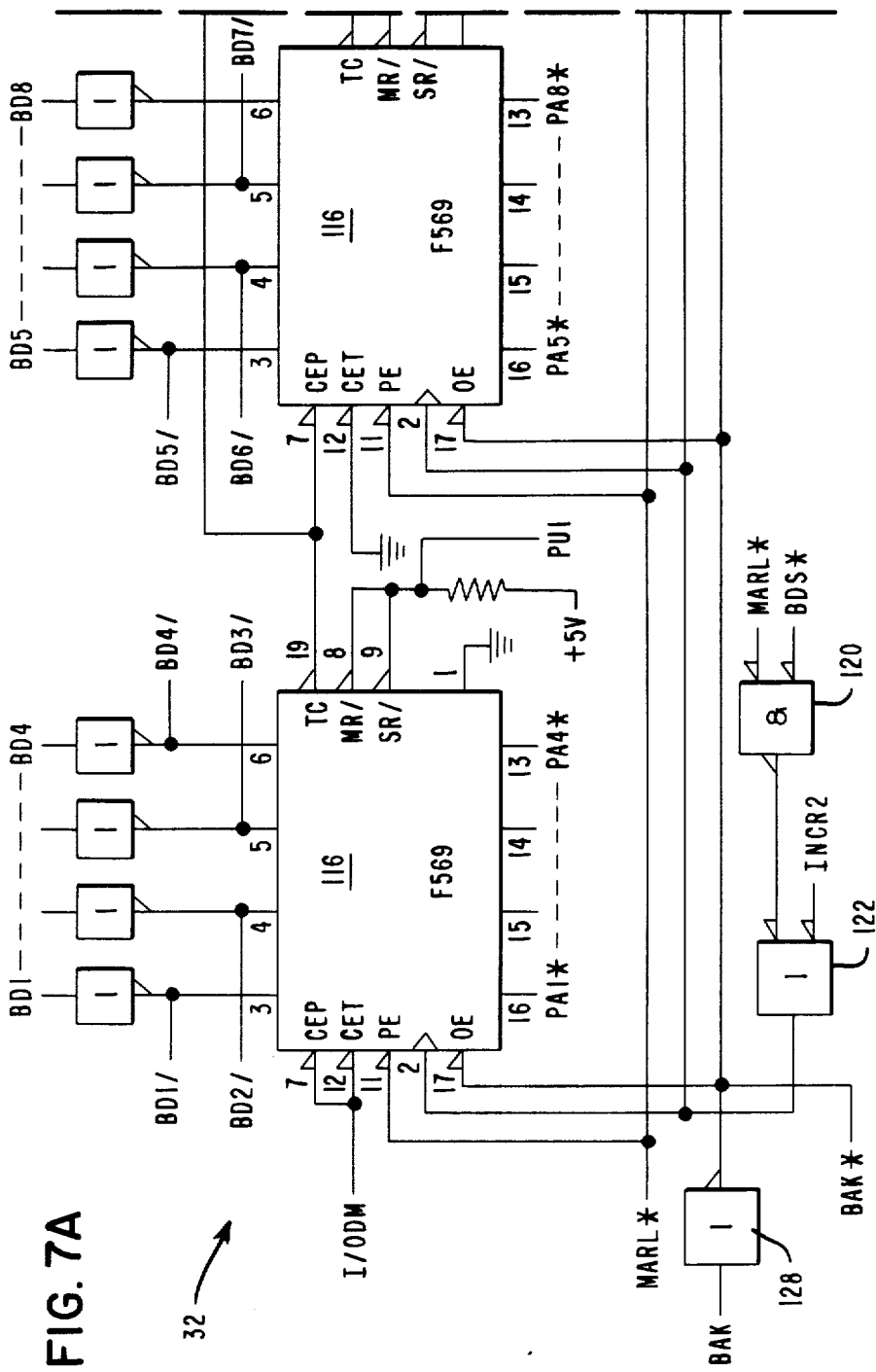
FIG. 7A is a portion of the block diagram of the system address register.
Figure 7C:
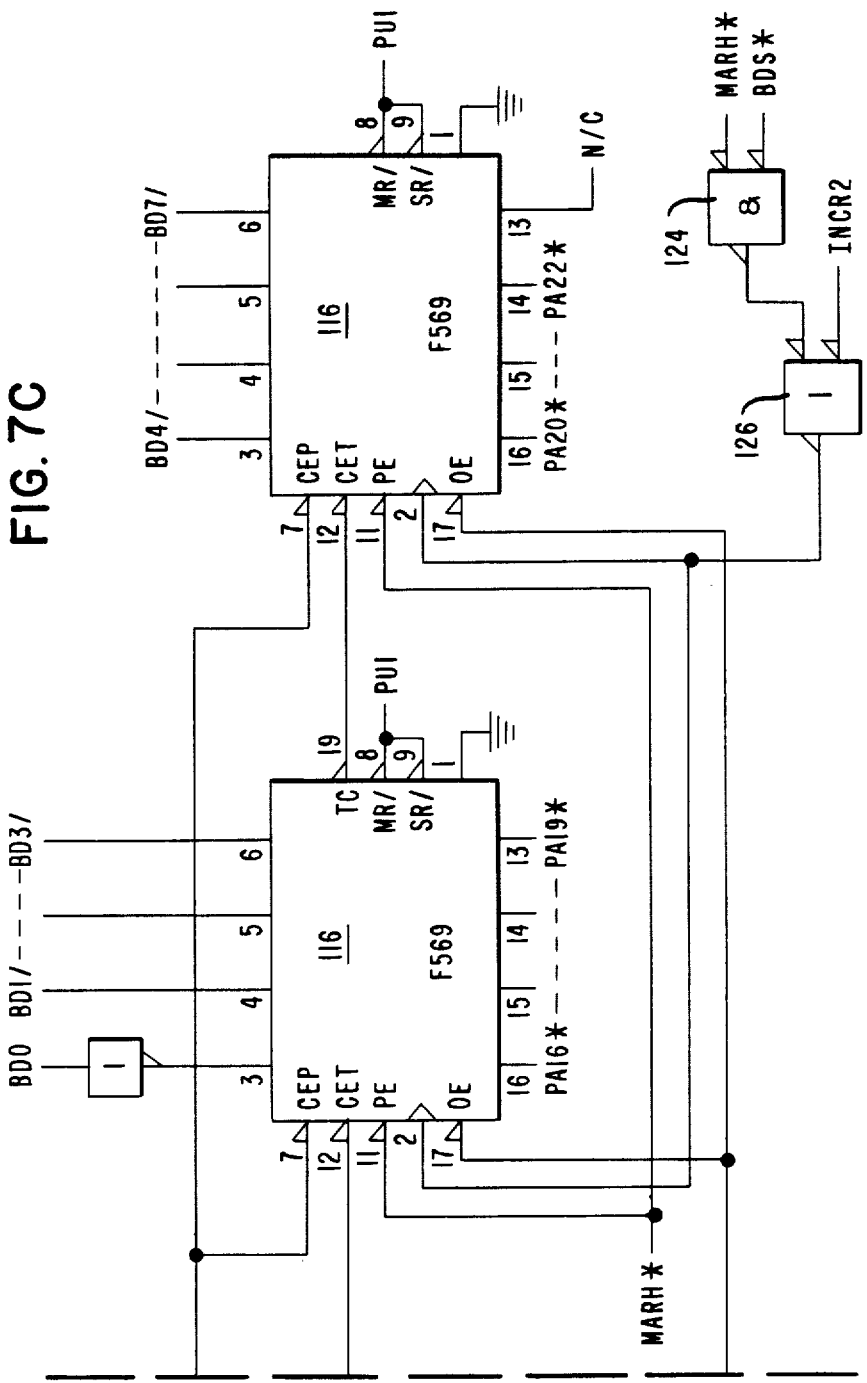
FIG. 7C is another portion of the block diagram of the system address register.

FIGS. 7A-7C, joined together as shown in the map of FIG. 7, is a block diagram of the system address register 32 of FIG. 1, and includes a plurality of counter chips 116 connected to form a 22 bit counter circuit. The inputs of each of the counter chips 116 are connected to four bits respectively of the data portion of the local bus 40 of FIG. 1. The outputs of each of the counter chips 116 are connected to four bits respectively of the address portion of the system bus 14 of FIG. 1. An I/ODM signal from the DMA sequencer decoder, to be discussed, is connected to one of the counter chips 116 for perform I/O transfers with peripheral devices on the system bus 14, not a part of the present invention.

The signal MARL* is inputted into the PE input, pin 11, of the lower four counter chips 116. The MARH* signal is inputted to the PE input, pin 11, of the upper two counter chips 116. The MARL* and BDS* signals are inputted into a negative AND gate 120 whose output is connected to one input of a negative OR gate 122. Also inputted into the negative OR gate 122, is the INCR2 signal. The output of the negative OR gate 122 is connected to the dynamic input, pin 2, of the lower four counter chips 116. The MARH* and BDS* signals are inputted into a negative AND gate 124, whose output is inputted to a negative OR gate 126 with the INCR2 signal. The output of the negative OR gate 126 is inputted to the dynamic input, pin 2, of the upper two counter chips 116. A bus acknowledge (BAK) signal is inverted by inverter 128 whose output (BAK*) is inputted into the OE inputs, pin 17, of all of the counter chips 116 of the system address register 32.

It will be understood that when the BAK* signal is active, the outputs of counter chips 116 of the system address register 32 will be enabled. When the MARL* and BDS* signals are active, the lower bits of the system address will be loaded from the local bus into the lower four counter chips 116, and that when MARH* and BDS* signals are active, the upper address bits will be loaded from the local bus 40 into the upper two counter chips 116 of the system address register 32. When the MARL* signal is active, the address and the system address register 32 will be loaded from the lower portion of the address counter chips 116 onto the system bus 14. Also, when the MARH* signal is active, the upper bits of the address in the system address register 32 will be loaded from the upper counter chips 116 onto the system bus 14. As previously explained in connection with FIG. 1, each time the INCR2 signal is made active, the count in the system address register 32 will be increased such that the next higher address will appear in the system address register 32. A resistor R30 has one end connected to a +5 volt source, and the other end connected to pins 8 and 9 of the counter chips 116 along with a pull up network PU1 to maintain a voltage on pins 8 and 9.

Figure 8B:
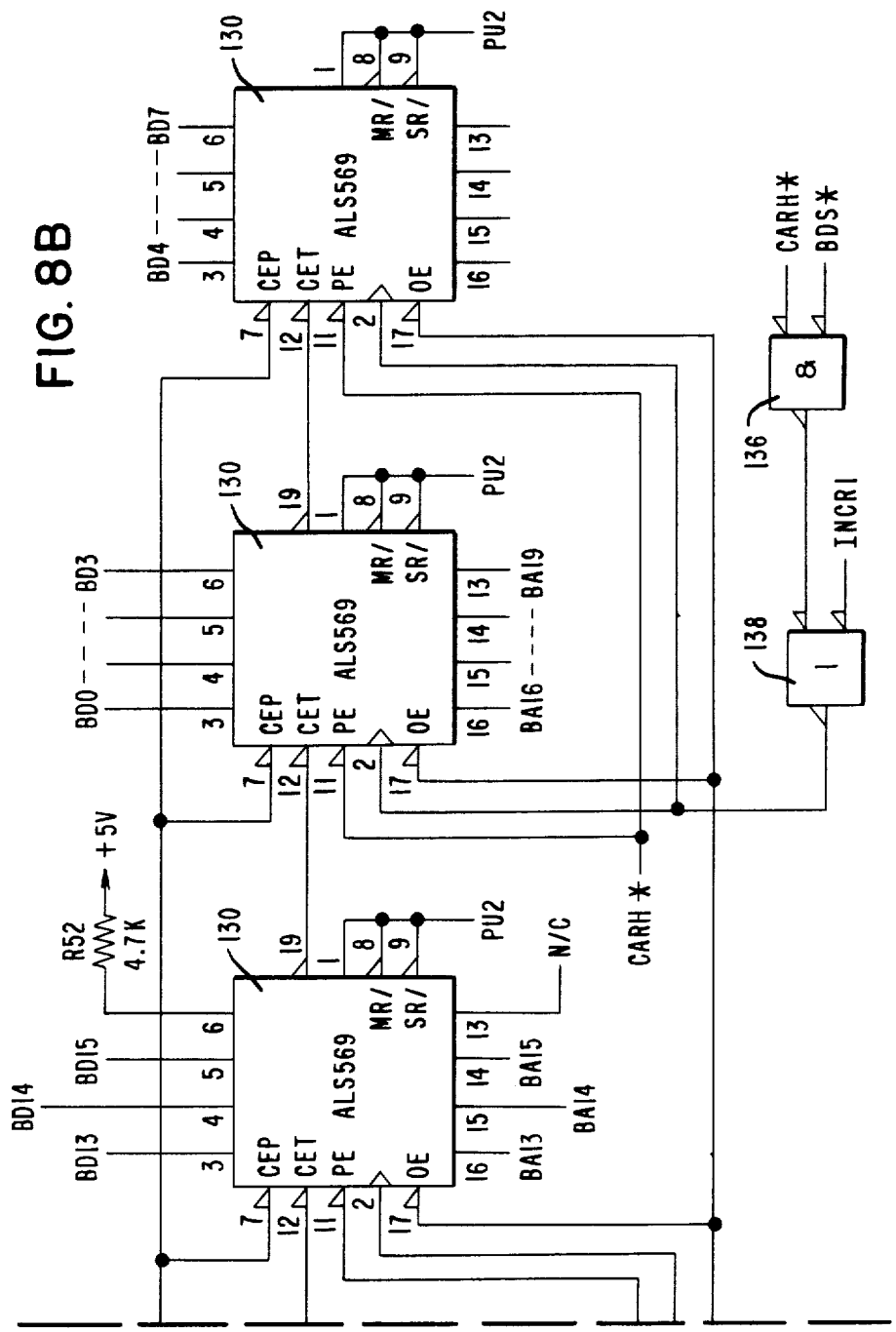
FIG. 8B is another portion of the block diagram of the local address register.

FIGS. 8A and 8B, joined together as shown in the map of FIG. 8, is a block diagram of the local address register 34 of FIG. 1, and includes a plurality of counter chips 130. The CARL* signal is inputted into the PE inputs, pin 11, of the lower four counter chips 130 and the CARH* signal is inputted into the PE inputs, pin 11, of the upper two counter chips 130 of the local address register 34. The CARL* and BDS* signals are inputted into a negative AND gate 132, whose output is inputted, along with the INCR1 signal, into a negative OR gate 134. The output of the negative OR gate 134 is inputted into the dynamic clock terminal, pin 2, of the lower four counter chips 130 of the local address register 34. The CARH* and BDS* signals are inputted into a negative AND gate 136 whose output is inputted, along with the INCR1 signal, into a negative OR gate 138. The output of the negative OR gate 138 is inputted into the dynamic clock terminal, pin 2, of the upper two counter chips 130, it will thus be understood that when the BAK* signal is active, all of the counter chips 130 of the local address register 34 will be enabled. When the CARL* and BDS* signals are active, the lower bits of the local address will be loaded from the data portion of the local bus 40 into the lower four counter chips 130. Similarly, when the CARH* and BDS* signals are active, the upper bits of the local address will be loaded into the upper two counter chips 130 from the data portion of the local bus 40. When the CARL* signal and the CARH* signal are active, the lower bits and the upper bits respectively will be loaded from the counter chips 130 of the local address register 34 onto the address portion of the local bus 40. Each time the INCR1 signal is made active, the address stored in the counter chips 130 of the local address register 34 will be incremented such that the next address will appear in the local address register 34. Counter chips 116 of FIGS. 7A-7C and counter chips 130 of FIGS. 8A and 8B are 74ALS569 devices available from Texas Instruments. A resistor R31 has one end connected to a +5 volt source, and its other end is connected to pins 1, 8 and 9 of the counter chips 130, along with a pull up network PU2 to maintain a voltage on pins 1, 8 and 9.

Figure 9:
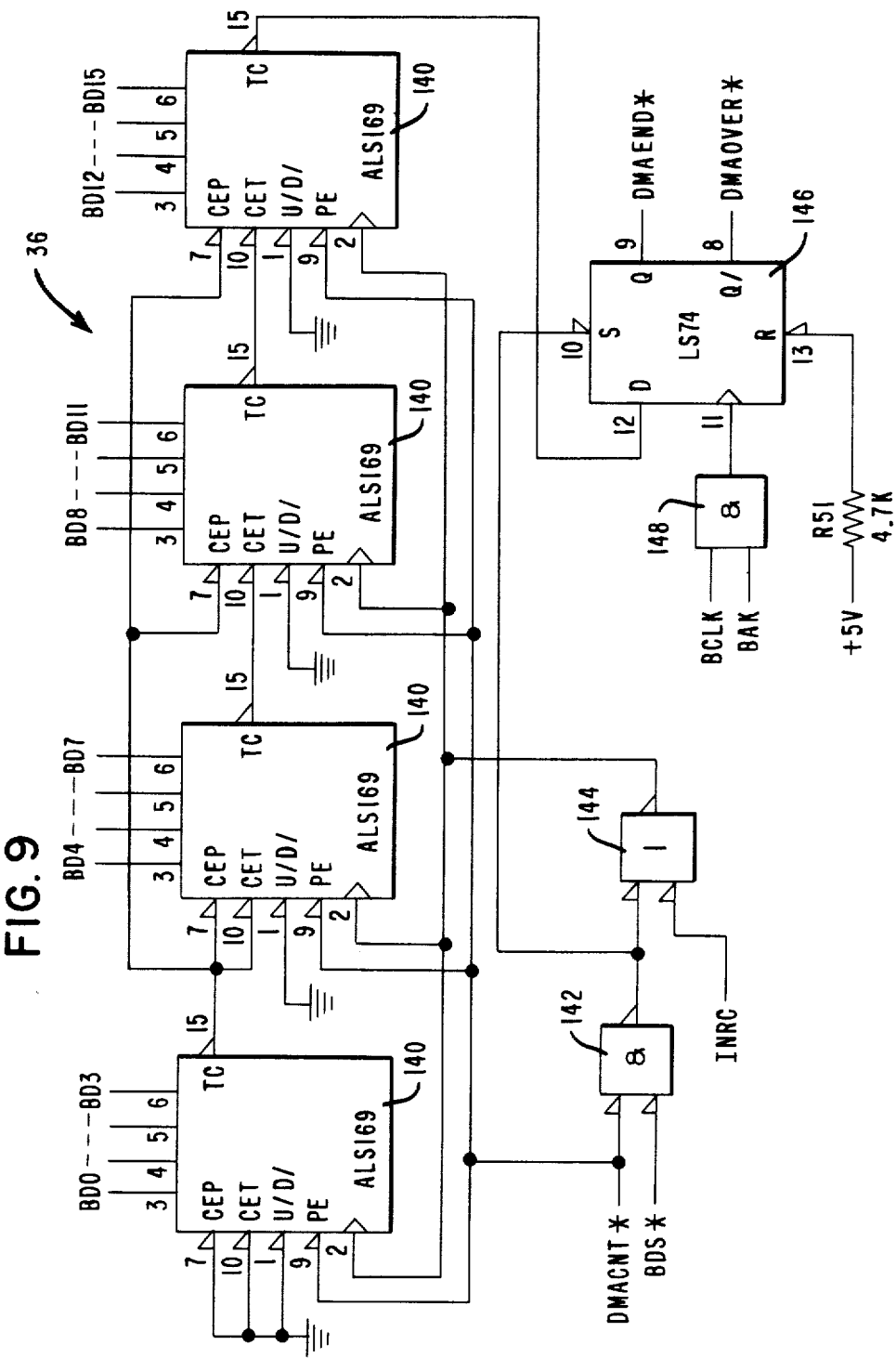
FIG. 9 is a block diagram of a DMA word count register of the DMA controller of FIG. 1.

FIG. 9 is a block diagram of the DMA word count register 36 of FIG. 1, and includes a plurality of counter chips 140, which are 74ALS169 devices available from Texas Instruments. The DMACNT* signal is connected to the PE input, pin 9, of each of the counter chips 140. The data bits BD0-BD15 of the local bus 40 are inputted into their respective data terminals, pins 3, 4, 5 and 6, of the counter chips 140. The DMACNT* and BDS* signals are inputted into a negative AND gate 142, whose output is inputted, along with the INRC signal, into the negative OR gate 144. The output of the negative OR gate is inputted to the dynamic clock terminal, pin 2, of each of the counter chips 140. The output of the negative AND gate 142 is also inputted into the set terminal, pin 10, of a D type 74LS74 flip-flop 146 available from Texas Instruments. The D input, pin 12, of the flip-flop 146 is connected to the terminal count output, pin 15, of the highest counter chip 140. The BCLK and BAK signals are inputted into an AND gate 148, whose output is inputted into the dynamic clock terminal of the flip-flop 146. The one output, pin 9, of the flip-flop 146 supplies the DMAEND* signal, and the zero output, pin 8, of the flip-flop 146 supplies a DMAOVER* signal. It will be understood that the DMAOVER* signal is the compliment of the DMAEND* signal. It will also be understood that when the DMACNT* and BDS* signals are active, the counter chips 140 will accept the count on the data portion of the local bus 40, and will set the flip-flop 146. Each receipt of an active INRC pulse by negative OR gate 144 will cause the counter chips 140 to decrement the count in the DMA word count circuit 36 by 1. When the count in the DMA word count register 36 reaches zero, the state of the terminal count output on pin 15 of the upper most counter chip 140 will change, causing the DMAEND* and the DMAOVER* signals from flip-flop 146 to change upon the simultaneous arrival of the BCLK and BAK* signals at AND gate 148.

Figure 10:
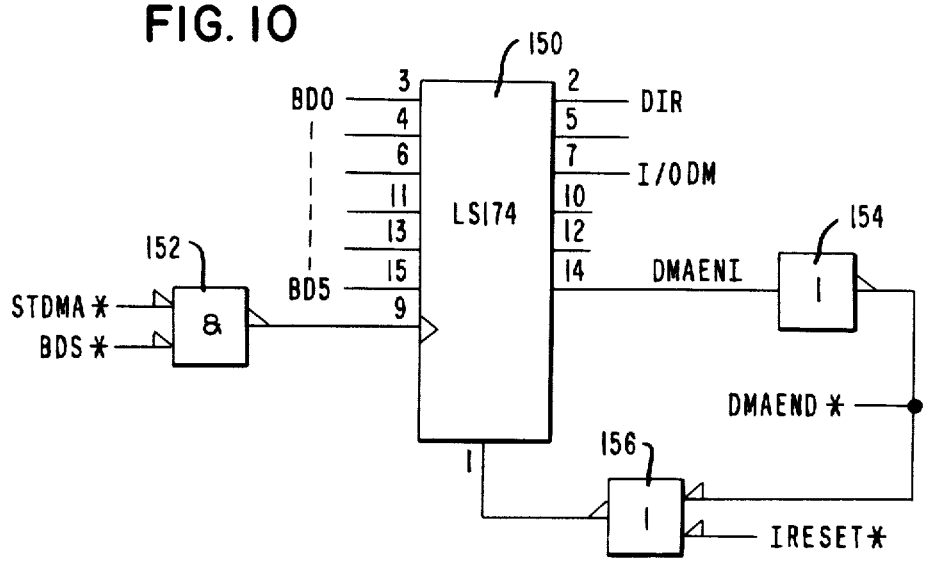
FIG. 10 is a block diagram of a DMA sequence buffer circuit of the DMA controller of FIG. 1.

FIG. 10 is a block diagram of a DMA sequencer buffer circuit which is part of the DMA sequencer circuit 30 of FIG. 1, and includes a latch circuit 150 whose inputs are connected to the BD0–BD5 bits of the data portion of the local bus 40. Latch circuit 150 is an 74LS174 device available from Texas Instruments. The dynamic clock terminal, pin 9, of the latch 150 is connected to the output of the negative AND gate 152 whose inputs are the STDMA* and BDS* signals. Thus, when both STDMA* and BDS* signals are active, the BD0–BD5 bits will be latched into latch circuit 150. BD0 supplies a DIR signal, BD2 supplies the I/O DM signal, and BD5 supplies a DMAENI signal. The BD1 signal is not used in the present embodiment. The DMAENI signal is inverted by an inverter 154, whose output is wire ORed with the one output of the flip-flop 146 of FIG. 9 which provides the DMAEND* signal. The outputs of the devices which are connected to the DMAEND* signal are all open collector type devices, such that when the output of either the inverter 154 or the one output of the flip-flop 146 goes to ground, all of the connected devices are pulled to ground. A reset signal (IRESET*) is inputted into one input of a negative OR gate 156, whose other input receives the DMAEND* signal. The output of negative OR gate 156 is connected to the clear terminal, pin 1, of the latch circuit 150. The IRESET* signal comes from the reset output, pin 16, of the microprocessor 70 of FIG. 2.

Figure 11:
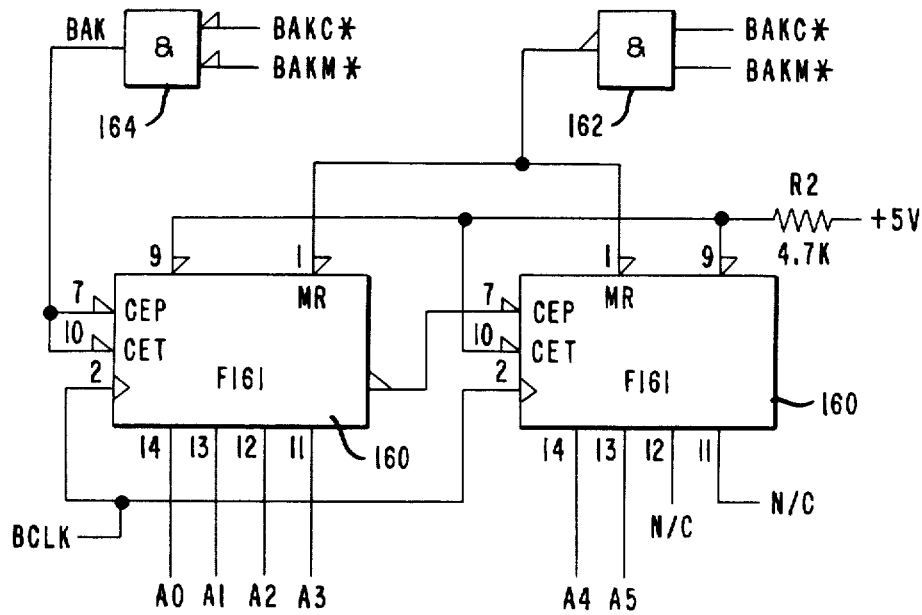
FIG. 11 is a block diagram of a PROM address counter circuit of the DMA controller of FIG. 1.

FIG. 11 is a block diagram of a PROM address counter of the DMA sequencer 30 of FIG. 1, and includes a pair of counter chips 160, which are 74F161 devices available from Fairchild. The output of the counter chips 160 provide address bits A0–A5 which are inputted into the address terminals of a programmable read only memory (PROM) for accessing a timing program stored therein, to be discussed. When the terminal pin 1, of each of the counter chips 160. The BAK signal from NOR gate 164 is inputted to the CEP terminal, pin 7, and the CET terminal, pin 10, of the lower chip 160. The board clock BCLK signal is inputted into the dynamic clock terminals, pin 2, of the counter chips 160.

It will be understood that when the BAKC* and BAKM* signals indicate that the local and system buses have been turned over to the DMA sequencer 30, the output of NAND gate 162 will reset the counter chip 160 back to zero. The output of NOR gate 164 will enable the counter chips 160 to start counting each of the board clock BCLK signals, thus incrementing from zero, the count on address bits A0–A5. The address bits A0–A5 steps through the program stored in a programmable read only memory (PROM), to be discussed, for timing the DMA sequencer 30.

Figure 12:
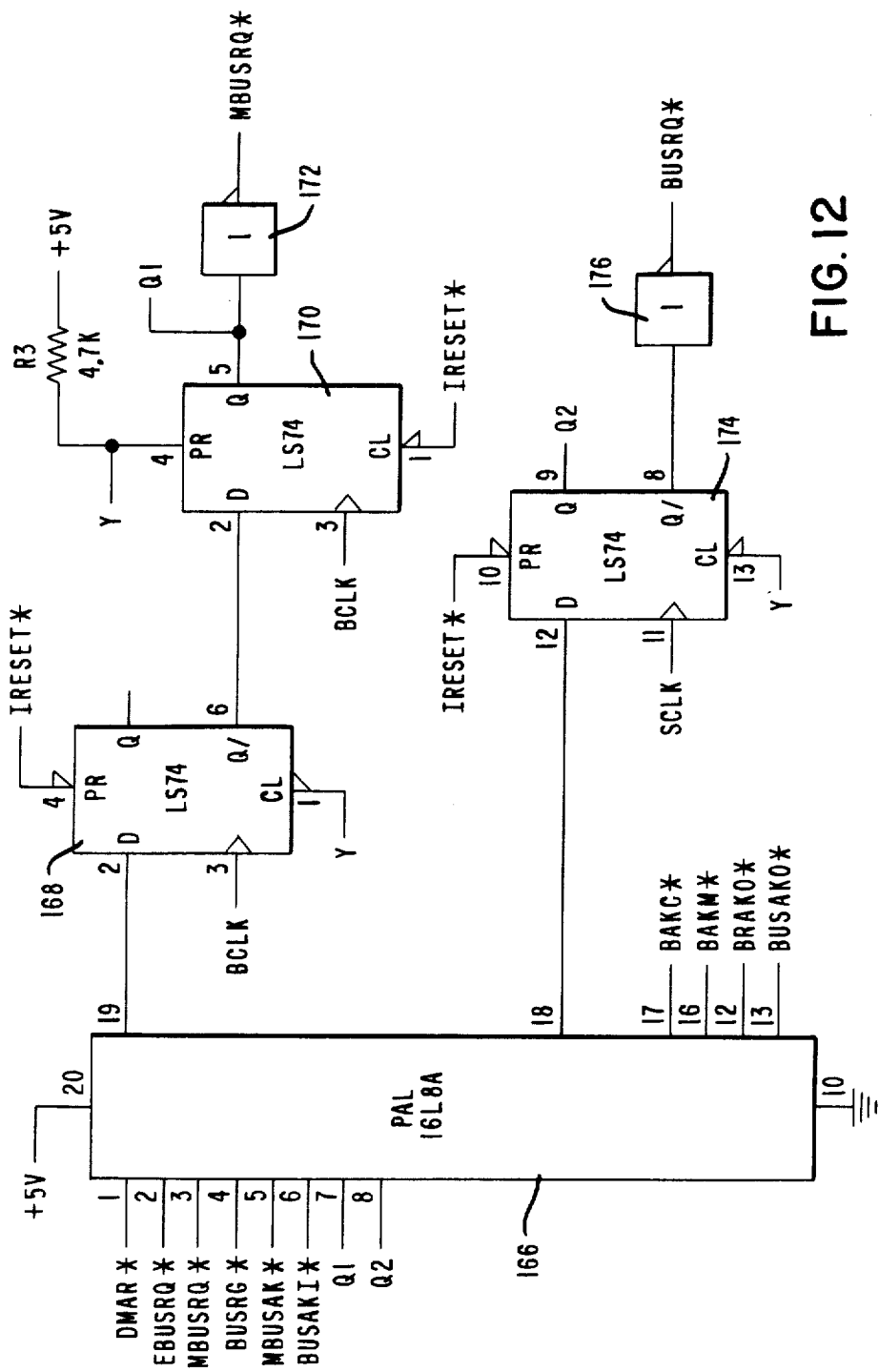
FIG. 12 is a block diagram of a bus requester circuit of the DMA controller of FIG. 1.

FIG. 12 is a block diagram for a bus requester circuit in the DMA sequencer 30 of FIG. 1. The bus requester circuit of FIG. 12 interrogates the various request signals, and based on the decoding of the signals, issues the microprocessor request (MBUSRQ*) signal discussed in connection with FIG. 2, and a CPU request (BUSRQ*) signal which is transmitted to the CPU 10 of FIG. 1. The bus requester circuit includes a programmable array logic chip 166 which is a 16L8A chip available from Monolithic Memories of Santa Clara, California. Signals input into the programmable array logic chip 166 are a DMA request (DMAR*) signal generated by the DMA timing generator to be discussed, a peripheral bus request (EBUSRQ*) signal generated by peripheral devices on the peripheral bus 68, the mentioned microprocessor request (MBUSRQ*) signal, the discussed CPU request (BUSRQ*) signal, the microprocessor acknowledge (MBUSAK*) signal which acknowledges relinquishment of the local bus by the microprocessor 70 as discussed in connection with FIG. 2, a CPU acknowledge (BUSAKI*) signal from the CPU 10 of FIG. 1 which acknowledges relinquishment of the system bus by the CPU 10, and Q1 and Q2 signals which are fed back from elements of the bus requester circuit, as will be discussed.

The programmable array logic chip 166 is programmed in accordance with instructions found in the "PAL Programmable Array Logic Handbook, third edition" available from Monolithic Memories, 2175 Mission College Boulevard, Santa Clara, California 95050. The programmable array logic chip 166 is programmed in accordance with the following equations:

| SIGNAL (pin19) | $= /DMAR^* \cdot MBUSRQ^* \cdot MBUSAK^* \cdot EBUSRQ^* + Q1 \cdot /DMAR^*$ | (Equation 1) |
|---|---|---|
| SIGNAL (Pin18) | $= /DMAR^* \cdot BUSRQ^* \cdot (BUSAKI^* + Q2 \cdot /DMAR^*$ | (Equation 2) |
| /BAKC* | $= /DMAR^* \cdot /MBUSAK^*$ | (Equation 3) |
| /BAKM* | $= /DMAR^* \cdot /BUSAKI^*$ | (Equation 4) |
| /BRAKO* | $= /DMAR^* \cdot /MBUSAK^*$ | (Equation 5) |
| /BUSAKO* | $= /DMAR^* \cdot /BUSAKI^*$ | (Equation 6) |
| Wherein: | / denotes complement of signal, · denotes AND function, and + denotes OR function. | |

DMA sequencer 30 requests the local bus, a bus acknowledge (BAKC*) signal is returned to indicate that the local bus 40 has been surrendered. Similarly, when the DMA sequencer 30 requests the system bus, a bus acknowledge (BAKM*) signal is returned to indicate that the system bus 14 has been surrendered. The BAKC* and BAKM* signals are inputted into a NAND gate 162 and a NOR gate 164. The output of the NOR gate 164 is the BAK signal previously discussed. The output of the NAND gate 162 is connected the MR Equation 1 is for a request signal when no other device is requesting the local bus. Equation 2 is for a request signal when no other device is requesting the system bus. Equation 3 is for an acknowledge signal for the DMA controller from the local microprocessor. Equation 4 is for an acknowledge signal for the DMA controller from the system processor. Equation 5 is for an acknowledge signal from a local microprocessor which is lower in the priority chain. Equation 6 is for an acknowledge signal from other devices of the system processor which are lower in the priority chain.

The output of pin 19 of the programmable array logic chip 166 is inputted to the data input of a D type flip-flop 168. The zero output of the flip-flop 168 is inputted to the data input of a D type flip-flop 170. The one output of the flip-flop 170 provides the Q1 signal previously mentioned which is inputted to the programmable array logic chip 166. The one output of the flip-flop 170 is also inverted by an invertor 172 for providing the MBUSRQ* signal. The dynamic clock inputs of flip-flop 168 and 170 receive the board clock (BCLK) signal such that the MBUSRQ* signal is in synchronization with the board clock signal. The output on pin 18 of the programmable array logic chip 166 is inputted into the data input of a D type flip-flop 174. The one output of the flip-flop 174 provides the Q2 signal inputted into the programmable array logic chip 166 as previously discussed. The zero output of the flip-flop 174 is inverted by inverter 176 to provide the BUSRQ* signal. A signal clock (SCLK) signal from a system clock, not shown, is received by the dynamic control input of the flip-flop 174 such that the BUSRQ* signal is in synchronization with the system clock, and thus is compatible with the timing of the CPU 10 of FIG. 1. Pin 17 of the programmable array logic chip 166 provides the BAKC* signal which provides an acknowledgement that the microprocessor chip 70 of FIG. 2 has relinquished the local bus 40. Pin 16 of the programmable array logic chip 166 provides the BAKM* signal, which provides an acknowledgement that the CPU 10 of FIG. 1 has relinquished the system bus 14. The BAKC* and BAKM* signals from pins 17 and 16, respectively, of the programmable array logic chip 166 are inputted into the NAND gate 162 and NOR gate 164 of FIG. 11 as previously discussed. The IRESET* signal into the preset terminals of the flip-flop 168, 170 and 174 is provided by the reset terminal, pin 16, of the microprocessor chip 70 of FIG. 2. Flip-flops 168, 170 and 174 are 74LS74 devices available from Texas Instruments.

Figure 13A:
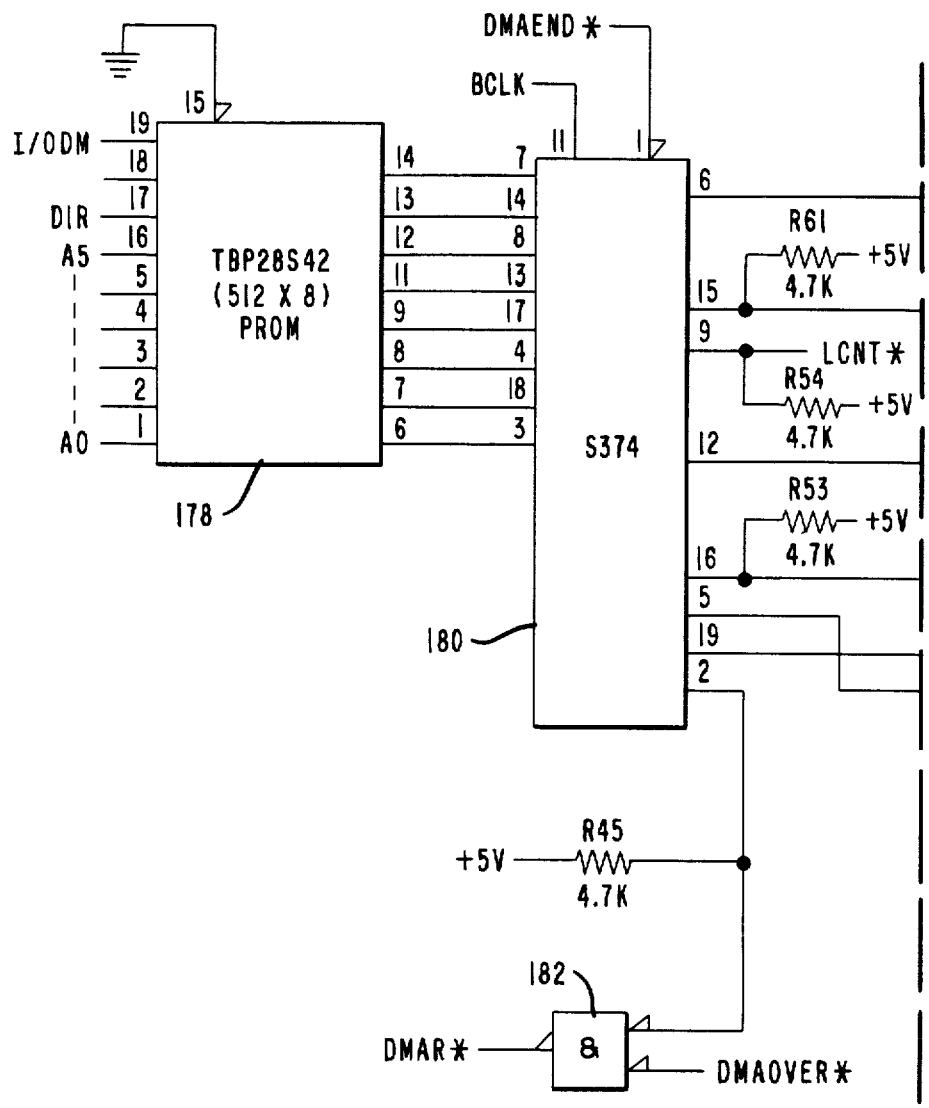
FIG. 13A is a portion of the block diagram of the timing generator circuit.
Figure 13:
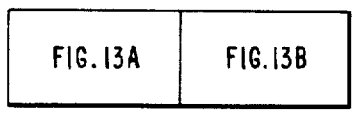
FIG. 13 is a map showing the relationship of FIGS. 13A-13B, which, when taken together, present a block diagram of timing generator circuit of the DMA controller of FIG. 1.
Figure 13B:
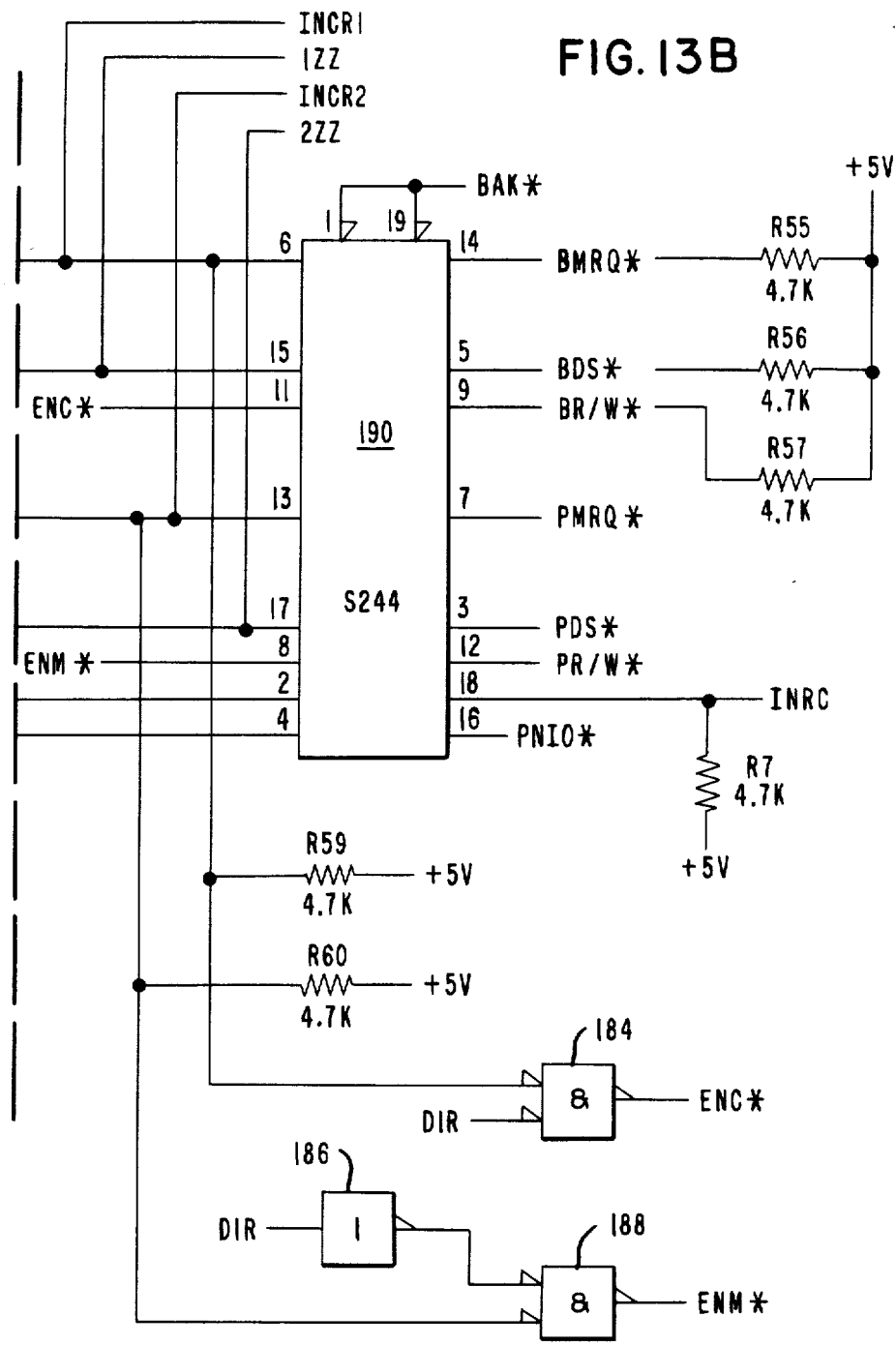
FIG. 13B is another portion of the block diagram of the timing generator circuit.

FIGS. 13A and 13B, when joined as shown in the map of FIG. 13, is a block diagram of a timing generator circuit for the DMA sequencer 30 of FIG. 1. and when functionally combined with the timing circuit of FIG. 5 forms a control means for generating the aforementioned first and second control signals. The timing generator circuit includes a programmable read only memory (PROM) 178, which is a TBP28S42 512 by 8 bit PROM device available from Texas Instruments. Address bits A0–A5 connected to inputs of the PROM 178 are provided by the outputs of the counter chips 160 of the PROM address counter circuit of FIG. 11. The I/ODM and DIR signals which make up the rest of the PROM address are provided by the buffer 150 of the latch circuit of FIG. 10. It will be understood that when an address is placed on the 8 bit address inputs of the PROM 178, the 8 bits stored in the PROM starting at that address will appear on the PROM outputs.

The bits outputted by the PROM 178 are inputted into a tri-state buffer device 180 which is a 74S374 chip available from Texas Instruments. The output control, pin 1, of the tri-state buffer device 180 receives the DMAEND* signal previously described, and the clock input, pin 11, of the tri-state buffer device 180 receives the BCLK signal also described. Pin 6 of the tri-state buffer device 180 provides the INCR1 signal, pin 15 provides the 1ZZ signal, pin 16 provides the 2ZZ signal, pin 9 provides the LCNT* signal, pin 12 provides the INCR2 signal, and the output of pin 2 is connected to one input of a negative AND gate 182. The other input of the negative AND gate 182 receives the DMAOVER* signal previously described. The output of the negative AND gate 182 is a DMA request (DMAR*) signal, which is provided to the programmable array logic chip 166 previously described in connection with FIG. 12. As previously described, when the DMAR* signal becomes active, through the logic of the programmable array logic chip 166, the MBUSRQ* signal is issued to the microprocessor 70 and the BUSRQ* signal is issued to the CPU.

The INCR1 signal is also inputted into a negative AND gate 184 with the DIR signal. The output of the negative AND gate 184 is the ENC* signal. The DIR signal is inverted by inverter 186, whose output is inputted with the INCR2 signal to a negative AND gate 188, whose output is the ENM* signal.

A buffer 190 is provided which is an 74S244 chip available from Texas Instruments. The output control pins 1 and 19 of the buffer 190 receive the BAK* signal from inverter 128 of FIG. 7, previously described. The output of pin 6 of the tri-state buffer 180 is connected to the input pin 6 of the buffer 190, output pin 15 of buffer 180 is connected to input pin 15 of buffer 190, the output of negative AND gate 184 is connected to the input pin 11 of buffer 190, the output pin 12 of buffer 180 is connected to the input pin 13 of buffer 190, the output pin 16 of buffer 180 is connected to the input pin 17 of buffer 190, the output of negative AND gate 188 is connected to the input pin 8 of buffer 190, output pin 5 of buffer 180 is connected to the input pin 4 of buffer 190, and the output pin 19 of buffer 180 is connected to the input pin 2 of buffer 190. Buffer 190 provides the BMRQ* signal on output pin 14, the BDS* signal on output pin 15, the BR/W* signal on output pin 9, the PMRQ* signal on output pin 7, the PDS* signal on output pin 3, the PR/W* signal on output pin 12, and the INRC signal on output pin 18, all of which have been previously described.

The operation of the DMA transfer will now be described. In the to be described example, the CPU 10 of FIG. 1 wishes to send data from the main memory 14 to the local memory 38. The data is to be taken from a specified starting address in main memory 14, and stored at a specified starting address in the local memory 38. After the starting addresses and number of words to be transferred are supplied to the microprocessor 26, the transfer operation is ready to begin. Referring now to FIGS. 2 and 6, the microprocessor chip 70 places the lower 16 bits of the main memory address on the data portion of the local bus 40, and addresses the I/O decode circuit of FIG. 6 such that the MARL* signal on pin 15 of the one-of-eight counter 114 goes active low. This causes the 16 bits to be loaded into the lower portion counter chips 116 of the system address register 32 of FIGS. 7A–7C. The high order data bits are then loaded by the microprocessor chip 70 on the data portion of the local bus 40, and the I/O decode circuit of FIG. 6 is addressed such that the MARH* signal goes active low, loading the high order data bits in the high order counter chips 116 of the system address register 32.

In a similar manner, the low order data bits of the local address are loaded into the low order counter chips 130 of the local address register of FIGS. 8A and 8B by the CARL* signal, and the high order data bits of the local address are loaded into the high order counter chips 130 of the local address register of FIGS. 8A and 8B by the CARH/signal. The value of the total words to be transferred are then placed, by the microprocessor chip 70, on the data portion of the local bus 40, and the I/O decoder circuit of FIG. 6 is addressed to cause the DMACNT* signal to go active low, to load the word count value into the DMA word count register 36 of FIG. 9. The DIR signal, which indicates the direction of transfer, the I/ODM signal and the DMAENI signal are placed on data bits BD0, BD2 and BD5 (BD1 is not used in the illustrated embodiment) of the local bus 40, and the I/O decode circuit of FIG. 6 is addressed by the processor chip 70 to cause the STDMA* signal to go active low, thereby starting the DMA operation.

The STDMA* signal, through the negative OR gate 152, will strobe the clock of the latch 150 of FIG. 10, latching the data on the data portion of the local bus 40. Since a value other than zero has been loaded into the DMA word count register 36 of FIG. 9, the zero output of the flip-flop 146 will be low, making the DMAOVER* signal active low. The low DMAOVER* signal will be inputted, along with the low on the output pin 2 of the tri-state buffer 180 which was made low at the end of the last DMA operation, to the negative AND gate 182 of FIG. 13A, whose output DMAR* will go low.

As discussed in connection with FIG. 12, the active low DMAR* signal is inputted into the programmable array logic chip 166, which causes an active low bus request BUSRQ* signal to the CPU 10 of FIG. 1, and an low bus request MBUSRQ* signal to the microprocessor chip 70 of FIG. 2A. When the local bus is relinquished by the microprocessor chip 70, and the main bus is relinquished by the CPU 10, they return active low MBUSAK* and BUSAKI* signals, respectively, to the programmable array logic chip 166, which responsively issues an active low BAKC* signal indicating the local bus 40 is released and an active low BAKM* signal indicating the main bus 14 is released.

Upon both of the BAKC* and BAKM* signals going active low, the PROM address counter circuit of FIG. 11 starts to count, and the output bits A0-A5 from the circuit of FIG. 11 are inputted into the PROM 178 of the DMA sequencer timing generator of FIG. 13A. It will be understood that at the receipt of each BCLK* pulse from the clock 69 of FIG. 3 by the PROM address counter circuit of FIG. 11, a new address will be presented to the PROM 178 of FIG. 13A, and a new set of timing signals will be presented to the tri-state devices of 180 and 190 to generate a new set of control signals. The direction signal DIR is presented to the PROM 178, and the gates 184 and 188 of FIG. 13B, which controls the order in which the ENC* and the ENM* signals, and the memory control signals on the output pins of the tri-state device 190 are generated. For instance, if the data transfer is from the local memory 38 to the main memory 12 of FIG. 1, in the first cycle of the DMA transfer operation, the first word of data is read from the local memory 38 and placed in the outgoing data register 58 of FIG. 1. In the second cycle of the DMA transfer operation, the first word of data is then passed from the outgoing data register 58 of FIG. 1, and written into the main memory 12 of FIG. 1. If, as in the illustrated example, the data transfer is from the main memory 12 to the local memory 38 of FIG. 1, in the first cycle of the DMA transfer operation, the first word of data is read from the main memory 12 and placed in the incoming data register 58 of FIG. 1. In this case, in the second cycle of the DMA transfer operation, the first word of data is then passed from the incoming data register 56 of FIG. 1, and written into the local memory 38 of FIG. 1.

FIG. 14 is a timing diagram for various control signals showing their relationship during the transfer of data from the main memory 12 to the local memory 38 through the incoming data register 56 of FIG. 1. A train of BCLK pulses 200 are provided from the board clock circuit of FIG. 3. The DMA transfer operation is divided into cycles, with seven BCLK pulses 200 in each cycle. The main memory request PMRQ* signal goes from a high state to an active low state at 202. Upon receipt of the edge 202 of the PMRQ* signal, the main memory starts a memory operation. The main memory data strobe PDS* signal has a negative going edge 204 and a positive going edge 206. The main memory read/write PR/W* signal remains high throughout the illustrated DMA transfer operation, indicating a read operation from the main memory is to occur. Upon the receipt of the edge 204 of the PDS* signal, the first word of data in the main memory 14 at the address contained in the system address memory is read and placed on the system bus 14. At the edge 206, the first word of data on the system bus 14 is latched into the incoming data register 56.

The local memory request BMRQ* signal has an edge 210 which starts the local memory operation in cycle 2. The local memory data strobe BDS* has a negative going edge 212 and a positive going edge 214. The local memory read/write BR/W* signal is at its low state at 216 during the local memory operation started at 210 of the BMRQ* signal, indicating that a write operation is to occur to the local memory 38. At the edge 212 of the BDS* signal, the DMA controller will take the first word of data in incoming data register 56, and write it into the local memory 38 at the address in the local address register 34. It will be seen that a first word of data is read from the main memory 12 in cycle 1, and is written into the local memory 38 in cycle 2. In cycle 2, a second word of data is read from the main memory 12 at edge 220 of the PDS* signal. However, this second word of data will not be latched into data register 56 until the edge 222, which occurs after the first word of data has been written out of the data register 56 at the edge 212 of the BDS* signal. It will thus be seen that in cycle 1, the first word of data will be read into incoming data register 56. In cycle 2, the first word of data will be written out of incoming data register 56, and then the second word of data will be read into incoming data register 56. In cycle n (see FIG. 14), the nth word of data is latched into the incoming data register 56 at 230. In cycle n+1, the nth word of data will be written out of the data register 56 to the local memory at 232. Thus, a complete transfer operation is completed in n+1 cycles, where n is the number of words being transferred in an operation.

The disclosed system is presently programmed to perform 16 word transfers in each DMA operation, after which the buses 14 and 40 are relinquished to the CPU 10 and the microprocessor 26, respectively. If the word count in the DMA word count register 36 has not been earlier reduced to zero during the previous transfer operation, then the buses 14 and 40 are again requested as described, and a new transfer operation starts until the word count in the DMA word register 36 is reduced to zero.

The programming of the PROM 178 of the DMA sequencer timing generator of FIG. 13 for transferring 16 words is shown in Table I. Addresses 0-7F(H) are for data transfer from the local memory 30 to the main memory 12 (DIR=0), and addresses 80-FF(H) are for transfer from the main memory 12 to the local memory 38 (DIR=1). Cycle 1 is shown at addresses 0-7(H) and 80-87(H), respectively; and cycle 18 is shown at address 78-7F(H) and F8-FF(H) respectively. Cycles 2-17 are shown at address 8-77(H) and 88-F7(H), respectively, each having seven addresses. Referring to FIG. 14, BCLK pulse 234 corresponds to the instruction at address 80(H) of Table I, and BCLK pulse 236 corresponds to the instruction at address FF(H).

Referring to FIGS. 13A and 13B, it will be noted that the INRC signal is the seventh bit output from the PROM 178, which is passed through the tri-state device 180 and buffer 190. It will be understood that when the seventh bit of the output of the PROM 178 goes to zero, an INRC signal will be generated. This occurs at address D(H) of Table I, and then every seventh address thereafter for sixteen cycles, and again at address 7B(H) for the last cycle when the DIR signal is 0 (addresses 0-7 F(H)). The seventh bit is also 0 at address 8D(H) of Table I, and every seventh address thereafter for sixteen cycles, and again at address FB(H) for the last cycle when the DIR signal is 1 (addresses 80-FF(H)).

TABLE I

| ADDR | DATA | ADDR | DATA |
|---|---|---|---|
| 0 | FE | 80 | FE |
| 1 | 7E | 81 | EE |
| 2 | 3E | 82 | E6 |
| 3 | 3E | 83 | E6 |
| 4 | 3E | 84 | E6 |
| 5 | 7E | 85 | EE |
| 6 | FE | 86 | FE |
| 7 | FE | 87 | FE |
| 8 | 6A | 88 | 4E |
| 9 | 2A | 89 | 46 |
| A | 22 | 8A | 06 |
| B | 22 | 8B | 06 |
| C | 6A | 8C | 4E |
| D | FC | 8D | FC |
| E | FE | 8E | FE |
| F | 6A | 8F | 4E |
| 10 | 2A | 90 | 46 |
| 11 | 22 | 91 | 06 |
| 12 | 22 | 92 | 06 |
| 13 | 6A | 93 | 4E |
| 14 | FC | 94 | FC |
| 15 | FE | 95 | FE |
| 16 | 6A | 96 | 4E |
| 17 | 2A | 97 | 46 |
| 18 | 22 | 98 | 06 |
| 19 | 22 | 99 | 06 |
| 1A | 6A | 9A | 4E |
| 1B | FC | 9B | FC |
| 1C | FE | 9C | FE |
| 1D | 6A | 9D | 4E |
| 1E | 2A | 9E | 46 |
| 1F | 22 | 9F | 06 |
| 20 | 22 | A0 | 06 |
| 21 | 6A | A1 | 4E |
| 22 | FC | A2 | FC |
| 23 | FE | A3 | FE |
| 24 | 6A | A4 | 4E |
| 25 | 2A | A5 | 46 |
| 26 | 22 | A6 | 06 |
| 27 | 22 | A7 | 06 |
| 28 | 6A | A8 | 4E |
| 29 | FC | A9 | FC |
| 2A | FE | AA | FE |
| 2B | 6A | AB | 4E |
| 2C | 2A | AC | 46 |
| 2D | 22 | AD | 06 |
| 2E | 22 | AE | 06 |

TABLE I-continued

| ADDR | DATA | ADDR | DATA |
|---|---|---|---|
| 2F | 6A | AF | 4E |
| 30 | FC | B0 | FC |
| 31 | FE | B1 | FE |
| 32 | 6A | B2 | 4E |
| 33 | 2A | B3 | 46 |
| 34 | 22 | B4 | 06 |
| 35 | 22 | B5 | 06 |
| 36 | 6A | B6 | 4E |
| 37 | FC | B7 | FC |
| 38 | FE | B8 | FE |
| 39 | 6A | B9 | 4E |
| 3A | 2A | BA | 46 |
| 3B | 22 | BB | 06 |
| 3C | 22 | BC | 06 |
| 3D | 6A | BC | 4E |
| 3E | FC | BE | FC |
| 3F | FE | BF | FE |
| 40 | 6A | C0 | 4E |
| 41 | 2A | C1 | 46 |
| 42 | 22 | C2 | 06 |
| 43 | 22 | C3 | 06 |
| 44 | 6A | C4 | 4E |
| 45 | FC | C5 | FC |
| 46 | FE | C6 | FE |
| 47 | 6A | C7 | 4E |
| 48 | 2A | C8 | 46 |
| 49 | 22 | C9 | 06 |
| 4A | 22 | CA | 06 |
| 4B | 6A | CB | 4E |
| 4C | FC | CC | FC |
| 4D | FE | CD | FE |
| 4E | 6A | CE | 4E |
| 4F | 2A | CF | 46 |
| 50 | 22 | D0 | 06 |
| 51 | 22 | D1 | 06 |
| 52 | 6A | D2 | 4E |
| 53 | FC | D3 | FC |
| 54 | FE | D4 | FE |
| 55 | 6A | D5 | 4E |
| 56 | 2A | D6 | 46 |
| 57 | 22 | D7 | 06 |
| 58 | 22 | D8 | 06 |
| 59 | 6A | D9 | 4E |
| 5A | FC | DA | FC |
| 5B | FE | DB | FE |
| 5C | 6A | DC | 4E |
| 5D | 2A | DD | 46 |
| 5E | 22 | DE | 06 |
| 5F | 22 | DF | 06 |
| 60 | 6A | E0 | 4E |
| 61 | FC | E1 | FC |
| 62 | FE | E2 | FE |
| 63 | 6A | E3 | 4E |
| 64 | 2A | E4 | 46 |
| 65 | 22 | E5 | 06 |
| 66 | 22 | E6 | 06 |
| 67 | 6A | E7 | 4E |
| 68 | FC | E8 | FC |
| 69 | FE | E9 | FE |
| 6A | 6A | EA | 4E |
| 6B | 2A | EB | 46 |
| 6C | 22 | EC | 06 |
| 6D | 22 | ED | 06 |
| 6E | 6A | EE | 4E |
| 6F | FC | EF | FC |
| 70 | FE | F0 | FE |
| 71 | 6A | F1 | 4E |
| 72 | 2A | F2 | 46 |
| 73 | 22 | F3 | 06 |
| 74 | 22 | F4 | 06 |
| 75 | 6A | F5 | 4E |
| 76 | FC | F6 | FC |
| 77 | FE | F7 | FE |
| 78 | EA | F8 | 5E |
| 79 | E2 | F9 | 5E |
| 7A | E0 | FA | 1E |
| 7B | EA | FB | 1C |
| 7C | FE | FC | 5E |
| 7D | FF | FD | FE |
| 7E | FF | FE | FF |

TABLE I-continued

| ADDR | DATA | ADDR | DATA |
|------|------|------|------|
| 7F   | FF   | FF   | FF   |

Thus, a system has been described which provides the aforementioned objects. It will be understood by those skilled in the art that the disclosed embodiment is exemplary only, and that the various elements disclosed may be replaced by equivalents, which equivalents are intended to be covered by the appended claims.

What is claimed is:

1. In a data processing system having a plurality of peripheral devices and a main memory, a direct memory access controller for controlling a transfer of data between the main memory and the peripheral devices comprising:

a local memory connected to the peripheral devices for storing data written to and read from the peripheral devices;

sequencer means for controlling the transfer of data between the main memory and said local memory;

local address register means connected to said sequencer means for providing the local memory address for memory operations of said local memory;

system address register means connected to said sequencer means for providing the main memory address for memory operations of said main memory;

data register means connected between said main memory and said local memory for holding data transferred between the main memory and said local memory;

control means in said sequencer means and connected to said main memory, said local memory and said data register means, said control means for generating control signals in control cycles for cotnrolling the transfer of words of data between the main memory and said local memory comprising:

first control signal generating means in said control means for generating a first control signal for the transfer of a first data word out of said data register means; and second control signal generating means in said control means for generating a second control signal subsequent to, and in the same control cycle as, the generation of said first control signal for the transfer of a second data word into said data register means.

2. The direct memory access controller of claim 1 wherein said control means includes incrementing means for transferring n words between the main meory and said local memory in n+1 control cycles.

3. The direct memory access controller of claim 2 wherein said incrementing means includes word count register means connected to said sequencer means for storing the number of words to be transferred; and incrementing signal generating means connected to said word count register means, said local address register means, and said system address register means;

said incrementing signal generating means generating in each control cycle, a first signal for decrementing the count in said word count register means, a second signal for incrementing the local memory address in said local memory address means and a third signal for incrementing the system memory address in said system address register means.

4. The direct memory access controller of claim 3 wherein said word count means includes indicating means for indicating when the number of control cycles of said control means equals the number of words to be transferred plus one.

5. The direct memory access controller of claim 4 wherein said indicating means includes means for detecting a zero in said word count means.

6. The direct memory access controller of claim 4 further comprising:

a system bus connected between the main memory and said system address register, said data register means, and said control means, said system bus for transmitting system addresses from said system address register to the main memory, for transmitting data between said main memory and said data register means and for transmitting control signals from said control means to said main memory;

a local bus connected between said local memory and said local address register, said data register means, and said control means, said local bus for transmitting local addresses from said local address register means to said local memory, for transmitting data between said local memory and said data register means and for transmitting control signals from said control means to said local memory; and said control means further includes bus request means responsive to said indicating means for requesting access to said system bus and said local bus when said indicating means indicates that the number of control cycles does not equal the number of words to be transferred plus one.

7. The direct memory access controller of claim 6 wherein said data register means includes an incoming data register connected between said system bus and said local bus for receiving data from said system bus and for writing the received data to said local bus, and an outgoing data register connected between said system bus and said local bus for receiving data from said local bus and for writing the received data to said system bus.

8. The direct memory access controller of claim 6 wherein said bus request means includes means for relinquishing said system bus and said local bus after said indicating means indicates that the number of control cycles equals the number of words to be transferred plus one.

9. The direct memory access controller of claim 8 wherein said system bus and said local bus generate acknowledge signals when granting the requests of said request means;

and said control means further comprises:

clock means for generating a train of clock pulses;

counting means responsive to said acknowledge signals for counting clock pulses from said clock means after the generation of said acknowledge signals;

a programmable read only memory (PROM) having address input terminals connected to said counting means, and data output terminals, said PROM being programmed to contain selected data bits which are outputted on said data output terminals when an address is inputted from said counting means to the address input terminals of said PROM; and decoding means connected to the output terminals of said PROM for decoding data bits thereon into said control signals for the main memory and said local memory.

10. The direct memory access controller of claim 9 wherein said incrementing signal generating means includes first, second and third output terminals of the output data terminals of said PROM, and said decoding means decodes the data bits on said first, second and third output terminals to generate said first, second and third signals, respectively, of said incrementing signal generating means.

11. The direct memory access controller of claim 10 further comprising a direction signal generating means for generating a direction signal indicating the direction of data transfer; and said PROM includes a direction input terminal connected to said direction signal generating means for selecting the addresses in said PROM from which the selected data bits are going to be outputted on said output data terminals dependent on the direction of data transfer.

12. The direct memory access controller of claim 11 wherein said direction signal generating means is a microprocessor.

13. The direct memory access controller of claim 12 further comprising mailbox means between said microprocessor and said system bus for transmitting messages between said system bus and said microprocessor, said messages to include a first starting address to be stored in said local address register means, a second starting address to be stored in said system address register means, a word count to be stored in said word count register means, and the direction of transfer.

14. The direct memory access controller of claim 12 wherein a central processing unit is connected to said system bus; and said mailbox means includes an incoming mailbox register connected between said system bus and said microprocessor for transferring incoming messages from said central processing unit to said microprocessor, and an outgoing mailbox register connected between said system bus and said microprocessor for transferring messages from said microprocessor to said central processing unit.

15. The direct memory access controller of claim 13 wherein said microprocessor is operatively connected to said local address register means for transmitting the first starting address of said message thereto, to said system address register means for transmitting the second starting address of said message thereto, and to said word count register means for transmitting the word count of said message thereto.

16. The direct memory access controller of claim 15 wherein said microprocessor is operatively connected to said local address register, said system address register means and said word count register means by said local bus.

17. A data transfer system comprising:
a system bus for transmitting data, addresses and control signals;
a central processing unit connected to said system bus;
a main memory connected to said system bus;
a local bus for transmitting data, addresses and control signals;
a microprocessor connected to said local bus;
a local memory connected to said local bus;
data register means connected between said system bus and said local bus for transferring data therebetween;
mailbox means connected between said system bus and said local bus, said mailbox for receiving from said central processing unit and placing on said local bus, a system starting address and a local starting address;
system address register means connected between said system bus and said local bus for receiving said system starting address from said local bus and for providing incremented system addresses to said main memory over said system bus;
local address register means connected to said local bus for receiving said local starting address from said local bus and for providing incremented local addresses to said local memory over said bus; and
sequencer means under the control of said microprocessor and connected to said system address register means, said local address means, said system bus and said local bus;
control signal generating means in said sequencer means for generating control signals in control cycles for said main memory, said local memory and said data register means for transferring data one word at a time between said main memory and said local memory;
a first control signal generator in said control signal generating means for generating a first control signal for transferring a first data word out of said data register means;
a second control signal generator in said control signal generating means for generating a second control signal subsequent to, and in the same control cycle as, said first control signal for transferring a second data word into said data register means; and
incrementing means in said sequencer means for incrementing the addresses in said system address register and said local address register after a word of data has been transferred between said data register means and one of said system bus or said local bus for providing an incremented system address to said main memory and for providing an incremented local address to said local memory.

18. The data transfer system of claim 17 wherein said control signal generating means includes means for transferring n words in n+1 control cycles.

19. The data transfer system of claim 17 wherein said central processing unit sends a word count indicating the number of words to be transferred through said mailbox means to said local bus; and said sequencer means further includes word count register means connected to said local bus and said incrementing means, said word count register means for receiving said word count from said central processing unit, and for being decremented by said incrementing means after each word of data is transferred, and for stopping the generation of control signals by said control signal generating means after said word count is decremented to zero.

20. The data transfer system of claim 17 wherein said sequencer means includes a clock for generating a train of clock pulses; and said control signal generating means comprises:
a counter under control of said microprocessor and connected to said clock for counting said clock pulses;

a programmable read only memory (PROM) having address input terminals connected to said counter for receiving the count of said counter as an address, and data output terminals on which selected data bits are placed in accordance to the address placed on said address input terminals of said PROM; and decoder means connected to the data output terminals of said PROM for decoding the data bits on said data output terminals into control signals for placement on said system bus and said local bus.

21. The data transfer system of claim 20 wherein said central processing system sends a direction signal, indicating the direction of transfer, through said mailbox to said local bus; and said address input terminals of said PROM includes a direction terminal for receiving said direction signal as a bit of the PROM address thereby selecting the data bits to be placed on said data output terminals dependent upon the direction of transfer desired.

* * * * *

UNITED STATES PATENT AND TRADEMARK OFFICE
CERTIFICATE OF CORRECTION

PATENT NO. : 4,722,051
DATED : January 26, 1988
INVENTOR(S) : Sandip Chattopadhya It is certified that error appears in the above—identified patent and that said Letters Patent is hereby corrected as shown below:

Column 20, line 5, after the word "mailbox", insert --means--.

Column 20, line 17, after the word "said", second occurrence, insert --local--.

Signed and Sealed this

Twenty-first Day of June, 1988

Attest:

DONALD J. QUIGG

Attesting Officer

Commissioner of Patents and Trademarks